US010928821B2

(12) United States Patent
Achtelik et al.

(10) Patent No.: US 10,928,821 B2
(45) Date of Patent: Feb. 23, 2021

(54) UNMANNED AERIAL VEHICLE-BASED SYSTEMS AND METHODS FOR GENERATING LANDSCAPE MODELS

(71) Applicant: Intel Corporation, Santa Clara, CA (US)

(72) Inventors: Markus Achtelik, Wörthsee (DE); Jan Stumpf, Planegg (DE); Daniel Gurdan, Germering (DE); Bastian Jaeger, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 269 days.

(21) Appl. No.: 15/803,136

(22) Filed: Nov. 3, 2017

(65) Prior Publication Data
US 2018/0129210 A1 May 10, 2018

Related U.S. Application Data

(60) Provisional application No. 62/433,731, filed on Dec. 13, 2016, provisional application No. 62/418,141, filed on Nov. 4, 2016.

(51) Int. Cl.
G05D 1/00 (2006.01)
G06T 17/05 (2011.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC ................ G05D 1/0094; B64C 39/024; B64C 2201/123; B64C 2201/127;
(Continued)

(56) References Cited

U.S. PATENT DOCUMENTS 5,243,370 A * 9/1993 Slater .................... F16M 13/04
248/123.2
5,801,948 A 9/1998 Wood et al.
(Continued)

FOREIGN PATENT DOCUMENTS

WO 2012024516 2/2012
WO 2015143173 9/2015

OTHER PUBLICATIONS

United States Patent and Trademark Office, "Non-Final Office Action," issued in connection with U.S. Appl. No. 15/803,141, dated Nov. 18, 2019, 16 pages.
(Continued)

Primary Examiner — Tuan C To
(74) Attorney, Agent, or Firm — Hanley, Flight & Zimmerman, LLC

(57) ABSTRACT

Unmanned aerial vehicle-based systems and related methods for aerial vehicle-based systems and methods for generating landscape models are disclosed herein. An example unmanned aerial vehicle includes a communicator to receive an instruction for the unmanned aerial vehicle to fly over an area of interest. The example unmanned aerial vehicle includes a camera to generate sensor data for the area of interest. The example unmanned aerial vehicle includes data generator to generate a three-dimensional model of the area of interest based on the sensor data. The communicator is to communicate the three-dimensional model to a vehicle.

20 Claims, 18 Drawing Sheets

(51) Int. Cl.
| | |
|---|---|
| *B64C 39/02* | (2006.01) |
| *G01C 11/02* | (2006.01) |
| *G01C 11/06* | (2006.01) |
| *G05D 1/10* | (2006.01) |
| *B64D 47/08* | (2006.01) |
| *G01C 5/00* | (2006.01) |
| *G06K 9/00* | (2006.01) |
| *A01B 79/02* | (2006.01) |

(52) U.S. Cl.
CPC ............... *G01C 5/00* (2013.01); *G01C 11/02* (2013.01); *G01C 11/06* (2013.01); *G05D 1/104* (2013.01); *G06K 9/00657* (2013.01); *G06T 17/05* (2013.01); *A01B 79/02* (2013.01); *B64C 2201/123* (2013.01); *B64C 2201/127* (2013.01); *B64C 2201/146* (2013.01)

(58) Field of Classification Search
CPC .... B64C 2201/146; B64D 47/08; G01C 5/00; G06K 9/00657; G06T 17/05
USPC .......................................................... 701/3
See application file for complete search history.

(56) References Cited

U.S. PATENT DOCUMENTS

| | | | |
|---|---|---|---|
| 5,884,205 A | 3/1999 | Elmore et al. | |
| 5,911,362 A | 6/1999 | Wood et al. | |
| 7,706,979 B1* | 4/2010 | Herwitz | G01S 13/003 |
| | | | 701/301 |
| 8,972,357 B2 | 3/2015 | Shim et al. | |
| 9,369,982 B2 | 6/2016 | Yang et al. | |
| 9,392,746 B2 | 7/2016 | Darr et al. | |
| 9,681,320 B2* | 6/2017 | Johnson | H04W 24/08 |
| 9,772,395 B2 | 9/2017 | Park et al. | |
| 9,824,596 B2* | 11/2017 | Arbeit | G01C 21/20 |
| 10,301,019 B1* | 5/2019 | Canavor | B64C 39/024 |
| 10,416,668 B2* | 9/2019 | Hammond | G01S 17/66 |
| 10,571,546 B2 | 2/2020 | Park et al. | |
| 2006/0028552 A1 | 2/2006 | Aggarwal et al. | |
| 2011/0137547 A1* | 6/2011 | Kwon | G01C 11/02 |
| | | | 701/532 |
| 2014/0316616 A1 | 10/2014 | Kugelmass | |
| 2015/0018018 A1 | 1/2015 | Shen et al. | |
| 2015/0092048 A1 | 4/2015 | Brunner et al. | |
| 2015/0145954 A1* | 5/2015 | Pulleti | B64C 39/02 |
| | | | 348/46 |
| 2015/0378015 A1 | 12/2015 | You et al. | |
| 2015/0379702 A1 | 12/2015 | Ulman | |
| 2016/0050840 A1 | 2/2016 | Sauder et al. | |
| 2016/0124435 A1* | 5/2016 | Thompson | G05D 1/0094 |
| | | | 348/144 |
| 2016/0292872 A1* | 10/2016 | Hammond | G01S 17/66 |
| 2016/0313736 A1* | 10/2016 | Schultz | B64D 47/08 |
| 2017/0015416 A1 | 1/2017 | O'Connor et al. | |
| 2017/0031365 A1 | 2/2017 | Sugumaran et al. | |
| 2017/0063998 A1 | 3/2017 | Fink | |
| 2017/0090007 A1 | 3/2017 | Park et al. | |
| 2017/0193828 A1* | 7/2017 | Holtzman | G08G 5/0069 |
| 2017/0247108 A1* | 8/2017 | Ljubuncic | B64C 39/024 |
| 2017/0299404 A1* | 10/2017 | Wang | G01S 7/4972 |
| 2017/0351005 A1* | 12/2017 | Alvarez | G01W 1/10 |
| 2017/0355458 A1* | 12/2017 | Chen | B64C 39/024 |
| 2018/0042174 A1* | 2/2018 | Li | A01D 41/127 |
| 2018/0061148 A1* | 3/2018 | Dudar | B64C 39/024 |
| 2018/0092295 A1* | 4/2018 | Sugumaran | G05D 1/0214 |
| 2018/0129879 A1 | 5/2018 | Achtelik et al. | |
| 2018/0196118 A1 | 7/2018 | Park et al. | |
| 2018/0372841 A1* | 12/2018 | Hieida | G08G 1/16 |
| 2019/0026531 A1* | 1/2019 | Alvarez Gonzalez | |
| | | | G06K 9/0063 |

OTHER PUBLICATIONS

Navarro et al., "Wi-Fi Localization Using RSSI Fingerprinting," California Polytechnic State University, San Luis Obispo, CA, 6 pages.
Wikipedia, "Wi-Fi positioning system," https://en.wikipedia.org/wiki/Wi-Fi.sub.—positioning.sub.—system#cite.s- ub.—note-1, accessed Sep. 24, 2015, 3 pages.
Wikipedia, "Indoor positioning system," https://en.wikipedia.org/wiki/Indoor.sub.—positioning.sub.—system, accessed Sep. 24, 2015, 10 pages.
Wikipedia, "Video tracking," https://en.wikipedia.org/wiki/Video.sub.—tracking, accessed Sep. 24, 2015, 4 pages.
Wikipedia, "Feature extraction," https://en.wikipedia.org/wiki/Feature.sub.—extraction, accessed Sep. 24, 2015, 3 pages.
Wikipedia, "Homography," https://en.wikipedia.org/wiki/Homography.sub.—%28computer.sub.—vision%2- 9, accessed Sep. 24, 2015, 3 pages.
Betke et al., "Tracking Large Variable Numbers of Objects in Clutter," Department of Computer Science, Department of Biology, Boston University, Department of Mechanical Engineering, Massachusetts Institute of Technology, IEEE 2007, 8 pages.
Redzic, "Dual-sensor fusion for seamless indoor user localisation and tracking," A Dissertation Presented to the Faculty of Engineering and Computing of Dublin City University, Sep. 2012, 182 pages.
United States Patent and Trademark Office, "Notice of Allowance," issued in connection with U.S. Appl. No. 15/803,141, dated Sep. 17, 2020, 9 pages.

* cited by examiner

UNMANNED AERIAL VEHICLE-BASED SYSTEMS AND METHODS FOR GENERATING LANDSCAPE MODELS

RELATED APPLICATIONS

This patent claims priority to U.S. Provisional Patent Application Ser. No. 62/418,141, filed on Nov. 4, 2016, under 35 U.S.C. § 119(e). This patent also claims priority to U.S. Provisional Patent Application Ser. No. 62/433,731, filed on Dec. 13, 2016, under 35 U.S.C. § 119(e). U.S. Provisional Patent Application Ser. No. 62/418,141 and U.S. Provisional Patent Application Ser. No. 62/433,731 are hereby incorporated by reference in their entireties.

FIELD OF THE DISCLOSURE

This disclosure relates generally to unmanned aerial vehicles, and, more particularly, to unmanned aerial vehicle-based systems and methods for generating landscape models.

BACKGROUND

Operators of heavy equipment vehicles (e.g., bulldozers, loaders, mining equipment, forestry equipment, agricultural equipment, etc.) often need to be aware of the environment surrounding such vehicles to properly move and/or otherwise implement the functionality of the vehicles.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
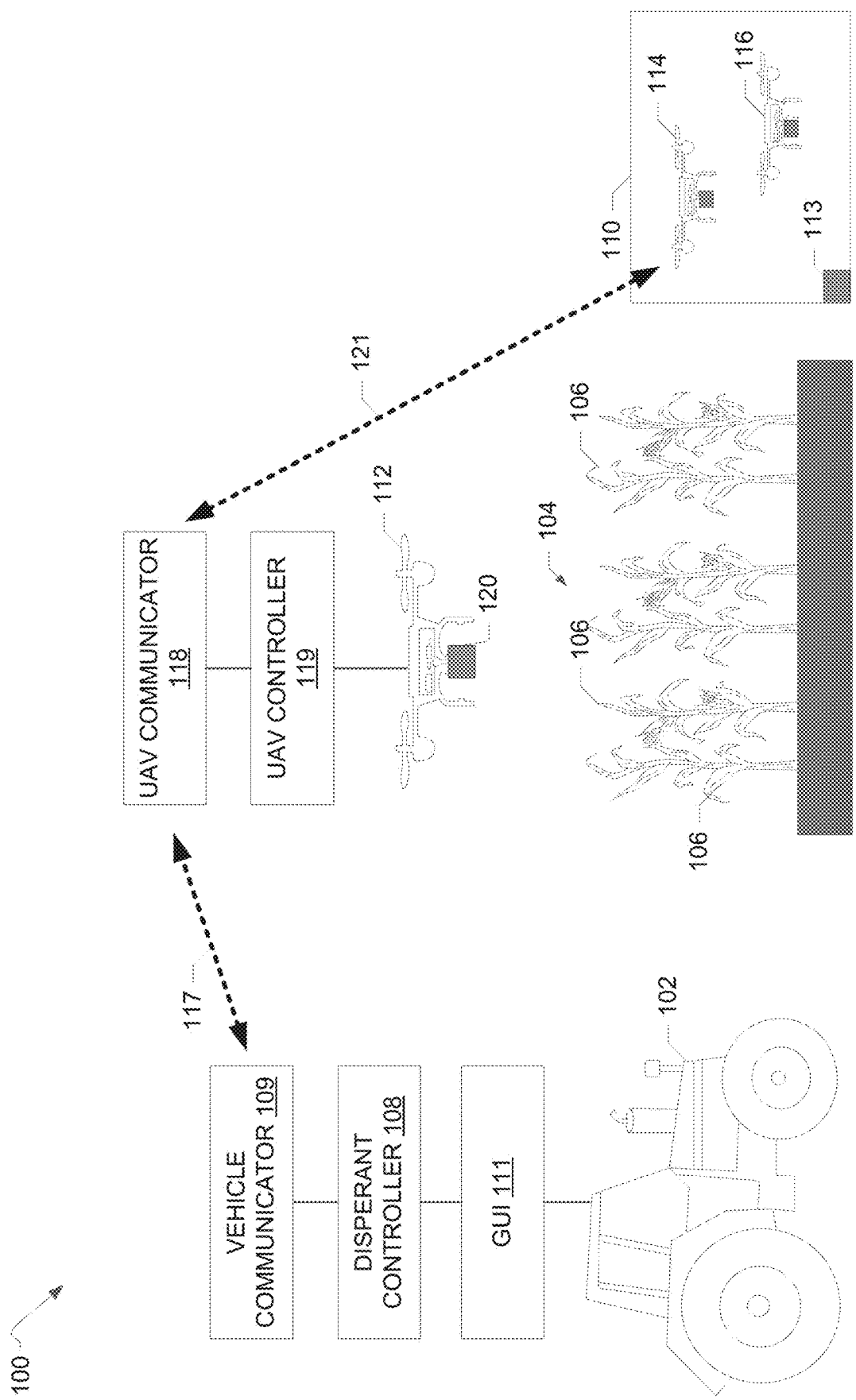
FIG. 1 illustrates an example system constructed in accordance with the teachings disclosed herein and located in an example environment of use.

Material treatment of crops includes applying one or more materials such as chemicals, fertilizers (e.g., nitrogen sprays), pesticides, etc. on the crops to deliver nutrients to promote crop growth and/or to prevent damage to the crops from diseases or insects. Agricultural chemical treatments are typically applied via an aircraft or a land vehicle such as a tractor. Data regarding an amount and/or condition of vegetation in an area can be used by, for example, a farmer, to apply agricultural chemicals to the crops.

Normalized difference vegetation index (NDVI) data can be used to identify an amount of vegetation in an area and/or a condition (e.g., a health) of the vegetation based on reflection of visible light and near-infrared light (e.g., sunlight) by plants. Differences in reflections of visible light and near-infrared light can be used to determine whether, for example, the area includes a dense population of plants or is an area that is sparse in vegetation, such as grassland. NDVI data can be used by, for example, a farmer to determine where to distribute agricultural treatment materials (e.g., chemicals) in an area such as a crop field during spraying. NDVI data can be generated based on image data collected by a camera. For example, a two-dimensional (2-D) image of the area of interest can be generated based on NDVI data as a representation of an amount of vegetation in the area. However, historical NDVI data used to create the image may become stale and may not reflect a current state of vegetation in the area. Also, agricultural treatment materials may be over-applied or under-applied to the vegetation due to inaccuracies by, for example, the farmer in mapping the NDVI-based image to the area of interest during application of the treatment materials. As a result, a farmer may have to re-apply the materials, which can result in inefficient distribution of the chemicals as well as increased costs. Alternatively, the farmer can over-apply the materials, resulting in wasted materials and potentially crop damage or even loss. Also, cameras used to collect the NDVI data can be heavy and/or cumbersome to operate via, for example, a tractor or other platform.

Just as image data of a landscape can assist farmers in an agricultural context, image data of a landscape can be useful in other contexts such as, for example, construction and foresting. More particularly, the construction of a building or other infrastructure on a piece of land typically involves the surveying of the landscape to determine the elevation changes across the area on which construction is to occur. Such information may be used to set and/or adjust the grade of bulldozers to precisely control how much earth is removed to prepare the foundation for a building or other structure. In the past, land surveying for construction has been accomplished via survey engineers using real time kinematic (RTK) global positioning system (GPS) devices to map out the elevation of the area of interest. Manually generating an elevation map can be laborious and time consuming. Furthermore, the resolution of the elevation map is limited to how close together each measured point on a landscape area of interest is to other adjacent points. In some situations, survey engineers may collect data points for an elevation map at points distributed across the area of interest as close as several feet apart. However, more refined resolutions are typically cost prohibitive.

Example systems and methods disclosed herein generate landscape data substantially in real-time via one or more unmanned aerial vehicles (e.g., drones) deployed over an area of interest such as a crop field. Example unmanned aerial vehicles (UAV) disclosed herein include one or more cameras that generate image data as the UAV(s) fly over the area. Some examples disclosed herein generate the landscape data based on the image data collected by the camera(s).

In some examples, the landscape data is used to generate a three-dimensional (3-D) image or elevation map of an area of interest that may be used in construction and/or foresting applications. In disclosed examples, the landscape data is transmitted substantially in real-time from the UAV(s) to a controller of, for example, a vehicle operating in the imaged area of interest such as, for example, a bulldozer grading the ground for a building or other structure. In some examples, the controller uses the landscape data (e.g., the elevation map) to set and/or adjust the grade of the bulldozer to precisely control the amount of earth, dirt, gravel, or other materials to be moved. Generating an elevation map substantially in real-time using the camera(s) on the UAV(s) can save significant amount of time when compared to the labor-intensive approach of survey engineers manually plotting the landscape surface elevation. Furthermore, elevation maps generated based on the image data captured by the camera(s) can be at a resolution comparable to the resolution of the cameras, which may be a substantial improvement over the traditional approach using RTK GPS devices.

In other examples, the landscape data is used to generate NDVI data that may be used in agricultural applications. In some examples, a three-dimensional (3-D) image of the area of interest is generated based on the landscape data. In disclosed examples, the landscape data is transmitted substantially in real-time from the UAVs to a controller of, for example, a vehicle operating in the imaged area of interest such as, for example, a tractor distributing agricultural treatment materials. As used herein, the term "treatment material" refers to one or more elements, chemicals, fertilizers, biological agents, pesticides, or the like to be applied to vegetation. In some examples, the controller uses the landscape data (e.g., NDVI data) to identify a location within the area to distribute the treatment material(s), to select the treatment material(s) to be applied by the vehicle, and/or to determine an amount of the treatment material(s) to be applied. Using substantially real-time image data collected from the UAV(s) provides for more precisely targeted distribution of chemicals to increase the efficiency of the use of the chemicals, thereby improving crop yields while reducing costs and protecting against over- and/or mis-application of chemicals that could result in crop damage and/or crop failure.

In some examples disclosed herein, one or more instructions to the UAV(s) are received as user input entered via the controller of the vehicle (e.g., a tractor, bulldozer, etc.) and transmitted to the UAV(s). For example, a user can define an area over which the UAV(s) are to be deployed via the controller of the vehicle. Based on the instructions received from the vehicle controller, the UAV(s) can be deployed over the area of interest (e.g., automatically take off from a launch pad, collect images of the identified area, and return to the launch pad) to collect image data to generate the NDVI data. In some disclosed examples, the UAV(s) can be monitored or tracked via the vehicle controller. Some disclosed examples include a launch pad that can be installed proximate to an area of interest (e.g., a crop field, a construction site, etc.) or on the vehicle for on-demand deployment of the UAV(s) as needed (e.g., when the crops are to be treated or the land is to be excavated or graded).

Although examples disclosed herein are primarily discussed in the context of agricultural treatment, the teachings disclosed herein can be utilized in other applications such as identifying road conditions for snow removal purposes, to generate elevation maps for construction and/or foresting purposes, etc. As such, the discussion of agricultural treatment is for illustrative purposes only and does not limit this disclosure to agricultural applications.

FIG. 1 illustrates an example system 100 constructed in the accordance with the teachings of this disclosure and shown in an example environment of use. The example system 100 of FIG. 1 generates NDVI data with respect to vegetation in the environment (e.g., in an area of land). The system transfers the data to a controller substantially in real-time for the application of one or more agricultural treatment material(s) (e.g., fertilizers, pesticides) to the vegetation. The example of FIG. 1 includes a vehicle 102 capable of applying one or more treatment materials. The example vehicle 102 is equipped with one or more apparatus to distribute the treatment material(s) (e.g., a sprayer boom). In some examples, the vehicle 102 is a land-based vehicle such as a tractor. In other examples, the vehicle 102 is an aerial vehicle, such as a crop duster. In the example of FIG. 1, the vehicle 102 applies a treatment material to an area 104 of the environment. The area 104 can be, for example, a crop field including vegetation 106 (e.g., crops or other plants), a portion of the crop field, or another area of land (e.g., a forest, etc.). In some examples, the area 104 is a portion of a larger area of land, such as a portion of a crop field containing the vegetation 106 to which the treatment material is to be applied. In some examples, areas of the land not containing the vegetation 106 to be chemically treated and/or containing one or more different type(s) of vegetation are not included in the area 104.

The example of FIG. 1 includes a dispersant controller 108. The dispersant controller 108 may be installed in the vehicle or remote from the vehicle 102. The dispersant controller 108 of this example controls distribution equipment of the vehicle 102 (e.g., a boom sprayer) to disperse one or more treatment material(s) (e.g., fertilizers, pesticides, etc.) on the vegetation 106. The example of FIG. 1 also includes a vehicle communicator 109 to receive data that is wirelessly transmitted to the vehicle communicator 109 via one or more protocols, such as WiFi, BLE, a wireless communication protocol such as LTE, and/or ultra-wide band radio technology. The vehicle communicator 109 may be installed in the vehicle 102 and/or installed in the dispersant controller 108. A user of the vehicle 102 may interact with the dispersant controller 108 and/or view data received by the vehicle communicator 109 via a graphical user interface (GUI) 111 displayed via a screen in the vehicle 102.

The example system 100 of FIG. 1 includes a base station 110. The base station 110 serves as a landing, storage, and/or power charging area for one or more unmanned aerial vehicles (e.g., drones). As illustrated in FIG. 1, the example system 100 also includes a first UAV 112, a second UAV 114, and a third UAV 116. In other examples, the system 100 may include additional or fewer UAVs. In the example system 100, the UAVs 112, 114, 116 take off from the base station 110 and fly over the area 104 to collect image data. The UAVs 112, 114, 116 generate NDVI data and transmit the NDVI data to the vehicle communicator 109 at the vehicle 102 substantially in real-time (e.g., +/−10 seconds). The UAVs 112, 114, 116 return to the base station 110 for power charging and/or storage as needed. In some examples, the base station 110 is located within or proximate to the area of interest 104 (e.g., within a flight distance of the area of interest 104 such that the UAVs can fly to the area, collect the image data, and return to the base station on a single charge of battery power). In other examples, the base station 110 is coupled to the vehicle 102 (e.g., a rear portion or a front portion of the vehicle 102) such that the UAV(s) 112, 114, 116 take off from and land on the vehicle 102. The base station 110 of the example of FIG. 1 includes a power source 113 (e.g., a battery) for charging the UAVs 112, 114, 116.

In the example system 100, a user of the vehicle 102 defines the area 104 or portion(s) thereof over which the UAV(s) 112, 114, 116 are to fly via one or more inputs to the dispersant controller 108 of the vehicle 102. For example, the user can input geographical coordinates of the area 104 via the GUI 111. In other examples, the area 104 is defined based on remotely entered user inputs and/or based on global positioning system (GPS) data collected via a GPS tracker of the vehicle 102. Data identifying the area 104 that is received by the controller 108 of the vehicle 102 is wirelessly transmitted to, for example, the first UAV 112 via the vehicle communicator 109 of the vehicle 102. In some examples, data identifying the area 104 is transferred to two or more of the UAVs 112, 114, 116 based on a size of the area 104 to be surveyed and the distance(s) that can be covered by the UAV(s) 112, 114, 116 before the UAV(s) 112, 114, 116 need to be recharged (e.g., multiple UAVs may be utilized to cover non-overlapping portions of the area 104). In some examples, two more of the UAVs may be instructed to survey the same portion of the area 104 but from different angles. For example, the first UAV 112 may image the area 104 from above while the second UAV 114 may image the same area 104 from a side (e.g., at an angle). In this manner, different perspectives of the same portion(s) of the area 104 may be captured and combined to generate better 3-D models of the landscape. Some UAV(s) may be surveying while others are charging.

In the example system 100 of FIG. 1, each of the UAVs 112, 114, 116 includes a UAV communicator 118. For illustrative purposes, the UAV communicator 118 is shown in FIG. 1 with respect to the first UAV 112 with the understanding that the second and third UAVs 114, 116 also include a UAV communicator similar or identical to the UAV communicator 118. As an example, the UAV communicator 118 of the first UAV 112 receives data identifying the area 104 over which the first UAV 112 is to fly from the vehicle communicator 109 via wireless transmission of the data between the UAV and vehicle communicators 109, 118, as represented by a wireless communication link 117 of FIG. 1.

Each of the UAVs 112, 114, 116 also includes a controller (e.g., a processor) 119 installed thereon. For illustrative purposes, the controller 119 is shown in FIG. 1 with respect to the first UAV 112 with the understanding that the example second and third UAVs 114, 116 also include a controller similar or identical to the controller 119. Continuing to refer to the first UAV 112 for ease of discussion, the example UAV communicator 118 of the first UAV 112 relays data (e.g., GPS coordinates) identifying the area 104 to the controller 119. The example controller 119 onboard the first UAV 112 controls the UAV 112 to take off from the base station 110 and fly over the area 104. In some examples, the controller 119 causes the first UAV 112 to fly over the area 104 at an identified height based on data received from the vehicle 102 with respect to, for example, a height of the vegetation 106 in the area 104 (e.g., the controller 119 instructs the first UAV 112 to use its sensors to maintain a vertical height of approximately 30 feet (e.g., +/−6 inches) above the vegetation 106 while travelling over the terrain of the area 104, which itself may vary in its height above sea level (i.e., elevation)).

In the example system 100 of FIG. 1, each of the UAVs 112, 114, 116 includes one or more camera(s) 120 coupled thereto. For illustrative purposes, the camera 120 is shown in FIG. 1 with respect to the first UAV 112 with the understanding that the second and third UAVs 114, 116 also include camera(s) similar or identical to the camera 120. As will be discussed below, the example camera 120 of FIG. 1 includes one or more color (e.g., RGB) sensors and one or more near-infrared sensors to capture light and generate image data (e.g., pixels). The example camera 120 of FIG. 1 (or any other sensor) can also measure depth via projection of near-infrared light via one or more infrared laser projectors of the camera 120 to generate 3-D images. In some examples, depth may be calculated based on image data without the use of a near-infrared projection. In the example of FIG. 1, the camera(s) 120 are implemented by RealSense™ cameras that are commercially available from Intel™ Corporation.

As the first UAV 112 flies over the area 104, the camera 120 of the first UAV 112 generates image and/or sensor data by capturing one or more images of the area 104. In the example system 100, the camera 120 generates image data in the X, Y, and Z planes. In some examples, the camera 120 captures a plurality of images corresponding to field(s) of view of the camera 120 based on a frame rate of the camera 120. In some examples, the camera 120 captures a plurality of images at different angles as the camera 120 flies over the area 104. In the example system 100, the first UAV 112 collects data within a time period occurring before the vehicle 102 passes through the area 104 to distribute treatment material(s). Any appropriate time frame may be used as the time period (e.g., less than 5 minutes, less than 1 minute).

In the example system 100 of FIG. 1, the respective UAV controllers 119 of the UAVs 112, 114, 116 generate NDVI data based on the image data generated by the camera(s) 120 as the respective UAVs 112, 114, 116 fly over the area 104. For example, the UAV controller 119 of the first UAV 112 stores and processes the image data collected by the camera 120 of the first UAV 112 as the first UAV 112 flies over the area 104. The example UAV controller 119 of this example analyzes the collected camera image data on a pixel-by-pixel basis with respect to the reflection of light by the vegetation 106 in the area 104 (e.g., the reflection of visible and/or near-infrared light projected by the camera 120 or sunlight). The UAV controller 119 calculates spectral reflectance measurements based on the pixels in the image to generate NDVI data to create a 3-D NDVI model of the area 104 surveyed by the UAV 112. In the example system 100, the NDVI model provides indications of, for example, an amount of the vegetation 106 in the surveyed area 104, a condition (e.g., health) of the vegetation 106, etc.

In some examples, the NDVI model is constructed based on a point cloud generated from the image data collected by the camera(s) 120. In some examples, the NDVI model is based on a plurality of point clouds fused together. Fusing multiple point clouds into a single model enables the reduction of noise in the data and/or the removal of outliers and/or other anomalies. The plurality of point clouds may be based on a plurality of images collected by the camera(s) 120 of the area 104 or a location within the area 104. In some examples, image data (e.g., raw image data) is transmitted from the one or more UAVs to another UAV for processing via, for example, a wireless communication link 121 between the UAV communicators 118 of the respective UAVs. For example, the second UAV 114 and/or the third UAV 116 can transmit image data collected by their respective cameras 120 to the first UAV 112. In some such examples, the image data from the second UAV 114 and/or the third UAV 116 is processed by the UAV controller 119 of the first UAV 112 (e.g., in conjunction with the image data collected by the first UAV 112). In some such examples, the UAV controller 119 of the first UAV 112 averages or takes a median of the pixel data and/or the NDVI data generated from the image data collected by the first, second, and/or third UAVs 112, 114, 116 for the overlaying portion(s) of the area 104 to generate the NDVI model. In some examples, the UAV controller 119 of the first UAV 112 filters the image data and/or the NDVI data generated therefrom to remove outliers due to, for example, shadows in the area 104 that may not accurately reflect the presence of the vegetation 106. The UAV controller 119 of the first UAV 112 can apply one or more data processing techniques to analyze the image data and/or the NDVI data generated therefrom as part of creating the NDVI model. In some examples, the image data is provided to the dispersant controller 108 and the dispersant control 108 generates the NDVI model.

In other examples, the respective UAV controllers 119 of the UAVs 112, 114, 116 process the image data generated by their cameras 120 (e.g., by the camera(s) carried by the corresponding UAV(s) 112, 114, 116). For example, the UAV controller 119 of the second UAV 114 can process the image data collected by the camera 120 of the second UAV 114 by filtering the data as discussed above in connection with the first controller 119 of the first UAV 112. In some such examples, the second UAV 114 transmits the filtered image data to another UAV, such as the first UAV 112. In such examples, the UAV controller 119 of the first UAV 112 generates the NDVI model based on the filtered image data received from the second UAV 112, the image data collected by the first UAV 112, and image data received from any other UAVs (which may or may not be filtered). In some examples, the UAVs (e.g., the second UAV 114) also transmit GPS data corresponding to the (raw or processed) image data to the first UAV 112 such that the image data is correlated to the GPS location(s).

In some other examples, the UAV controller 119 of, for instance, the second UAV 114 generates NDVI data (e.g., spectral reflectance measurements) based on the image data collected and processed by the second UAV 114. In some such examples, the second UAV 114 transmits the NDVI data to the first UAV 112. The first controller 119 of the first UAV 112 generates the NDVI model based on (1) the NDVI data received from the second UAV 114, (2) the NDVI data generated by the UAV controller 119 of the first UAV 112 based on image data collected by the first UAV 112, and (3) NDVI data received from any other UAVs.

In other examples, the UAV controller 119 of, for instance, the second UAV 114 generates an NDVI model based on the NDVI data generated by the second UAV 114. In some such examples, the second UAV 114 transmits the point cloud data (e.g., 2-D or 3-D image data) to the UAV controller 119 of the first UAV 112. In such examples, the UAV controller 119 of the first UAV 112 fuses (e.g., merges or combines) the point cloud data from the various other UAVs 112, 114, 116 to generate an NDVI point cloud for the area 104. The point cloud data received from each UAV can correspond to different portions of the area 104, overlapping portion(s) of the area 104, and/or the same portion(s) of the area 104 depending on the scope of flight coverage by the UAVs 112, 114, 116. In examples where the point cloud data corresponds to the same or overlapping portions of the area 104, the UAV controller 119 of the first UAV 112 can selectively use data from one of the UAVs or average or take a median of the point cloud data to generate the combined point cloud. Thus, the UAVs 112, 114, 116 of the example system of FIG. 1 work in concert to generate an NDVI model for the area 104 and/or one or more portions of the area 104. For example, the UAVs 112, 114, 116 may form a mesh network to consolidate data and deliver the consolidated data to the vehicle 102 for use and/or further processing.

In the example system 100 of FIG. 1, the vehicle 102 is within a range of the area of interest 104 or in the area of interest 104 at substantially the same time as the UAV(s) 112, 114, and/or 116 such that the vehicle communicator 109 can communicate with the UAV communicator(s) 118. In the example system 100 of FIG. 1, the NDVI model is wirelessly transmitted from the UAV communicator 118 of the first UAV 112 (or any of the other UAVs) to the vehicle communicator 109 of the vehicle 102 substantially in real-time. For example, the UAV(s) 112, 114, 116 can fly ahead of the vehicle 102 relative to a direction of travel of the vehicle 102 in the area 104. Thus, the UAV(s) 112, 114, 116 collect image data for the area 104 to which the vehicle 102 has not yet applied treatment material(s) during a current application time period. As discussed above, in some examples, the UAV controllers 119 of the UAVs 112, 114, 116 create the NDVI model as the UAV(s) 112, 114, 116 fly over the area 104 and the cameras 120 generate image data of the vegetation 106 in the area 104. One or more of the UAV communicators 118 of the UAV(s) 112, 114, 116 transmit the 3-D NDVI model(s) to the vehicle communicator 109 of the vehicle 102 substantially in real-time. The vehicle communicator 109 delivers the NDVI model(s) to the dispersant controller 108. In some examples, the UAV communicator(s) 118 may compress the NDVI model prior to transmission. Alternatively, in some examples, the dispersant controller 108 generates the NDVI model based on sensor data provided from the UAV(s) by combining, consolidating, or fusing the data. In other examples, the dispersant controller 108 analyzes the NDVI model(s) received from the UAV(s) independent of one another (e.g., in examples where the NDVI data from each UAV corresponds to a different portion of the area 104). In some examples, the data collected by the UAVs is combined into one point cloud for delivery to the vehicle.

In some examples, the UAV communicators 118 of the UAV(s) 112, 114, 116 transmit the NDVI data (e.g., spectral reflection measurement data) to the vehicle communicator 109 of the vehicle 102 in substantially real-time. In such examples, the dispersant controller 108 of vehicle 102 generates the NDVI model(s) based on the NDVI data received from the UAV(s) 112, 114, 116.

As discussed above, in some examples, each of the NDVI model(s) generated by the UAVs 112, 114, 116 are fused (e.g., merged, combined, etc.) by one of the UAV controllers, such as the UAV controller 119 of the first UAV 112. In other examples, the UAV controller 119 of one of the UAVs 112, 114, 116 generates the NDVI model based on image data (e.g., raw image data, pre-processed image data) received from the other UAV(s) 112, 114, 116 and transmits the NDVI model to the vehicle communicator 109 of the vehicle 102. Thus, in some examples, the vehicle 102 may receive data (e.g., point cloud(s)) from one UAV 112, 114, 116, which acts as a hub for collecting and processing the data.

In some examples, the dispersant controller 108 displays the NDVI model(s) via the GUI 111 of the vehicle 102. In some examples, the dispersant controller 108 analyzes the NDVI model(s) and generates one or more instructions to be performed by the vehicle 102 with respect to spraying or otherwise applying the treatment material(s) to the vegetation 106 in the area 104. For example, the dispersant controller 108 can select a chemical to be applied to the vegetation 106 based on an analysis of a growth state of the vegetation 106 as represented by the NDVI model(s). In some examples, the dispersant controller 108 determines an amount of the treatment material(s) to be applied to the vegetation 106 based on the analysis of the NDVI model. In some examples, the dispersant controller 108 determines a height at which the treatment material(s) are to be applied based on the depth data provided by the NDVI model and/or a height at which the boomer sprayer is to be positioned during application of the treatment material(s) (e.g., as a result of the 3-D image generation of the camera(s) 120 of the UAV(s) 112, 114, 116). In some examples, the dispersant controller 108 identifies a particular location (e.g., geographical coordinates) within the area 104 that includes vegetation 106 to which the treatment material(s) are to be applied. In some such examples, the dispersant controller 108 communicates with a GPS tracker of the vehicle 102 to identify the location in the area 104 and/or provides directions for the vehicle 102 to reach the location.

Thus, the example system 100 provides enhanced NDVI data in the form of 3-D NDVI model(s) generated by one or more UAVs and/or by a vehicle based on sensor data collected and/or streamed by a UAV and transmitted substantially in real-time to the vehicle 102. Regardless of where the model is generated (at the UAV or at the vehicle), the vehicle 102 receives substantially current information about the vegetation 106 in the area 104. The NDVI model can be used to more accurately identify locations within the area 104 that include vegetation 106 to receive the treatment material(s) as compared to historical NDVI data. The 3-D point cloud(s) used to generate the NDVI model enable increased precision in applying the treatment material(s) with respect to, for example, a height of the vegetation 106 as compared to 2-D images. Thus, the example system 100 enables efficient, cost-effective, and environmentally friendly distribution of treatment material(s) to vegetation.

Also, the incorporation of the cameras 120 on the UAVs 112, 114, 116 provide for lightweight and/or non-obstructive apparatus by which to generate NDVI data as compared to known cameras or other sensors.

After the UAV(s) 112, 114, 116 survey the area 104, the UAV(s) 112, 114, 116 return to the base station 110. In some examples, the camera(s) 120 of the UAV(s) 112, 114, 116 generate image data as the UAV(s) fly back to the base station 110, including depth data with respect to a height of the UAV(s) 112, 114, 116. The UAV controller(s) 119 of the respective UAV(s) use the image data to determine respective landing location(s) for the UAV(s) 112, 114, 116 (e.g., identifying a location of the base station 110 from the image data, identifying a height of the base station 110 from the image data, etc.). Thus, the 3-D images generated by the camera(s) 120 can be used by the UAV controller(s) 119 to increase precision in the respective landing location(s) of the UAV(s) 112, 114, 116.

Figure 2:
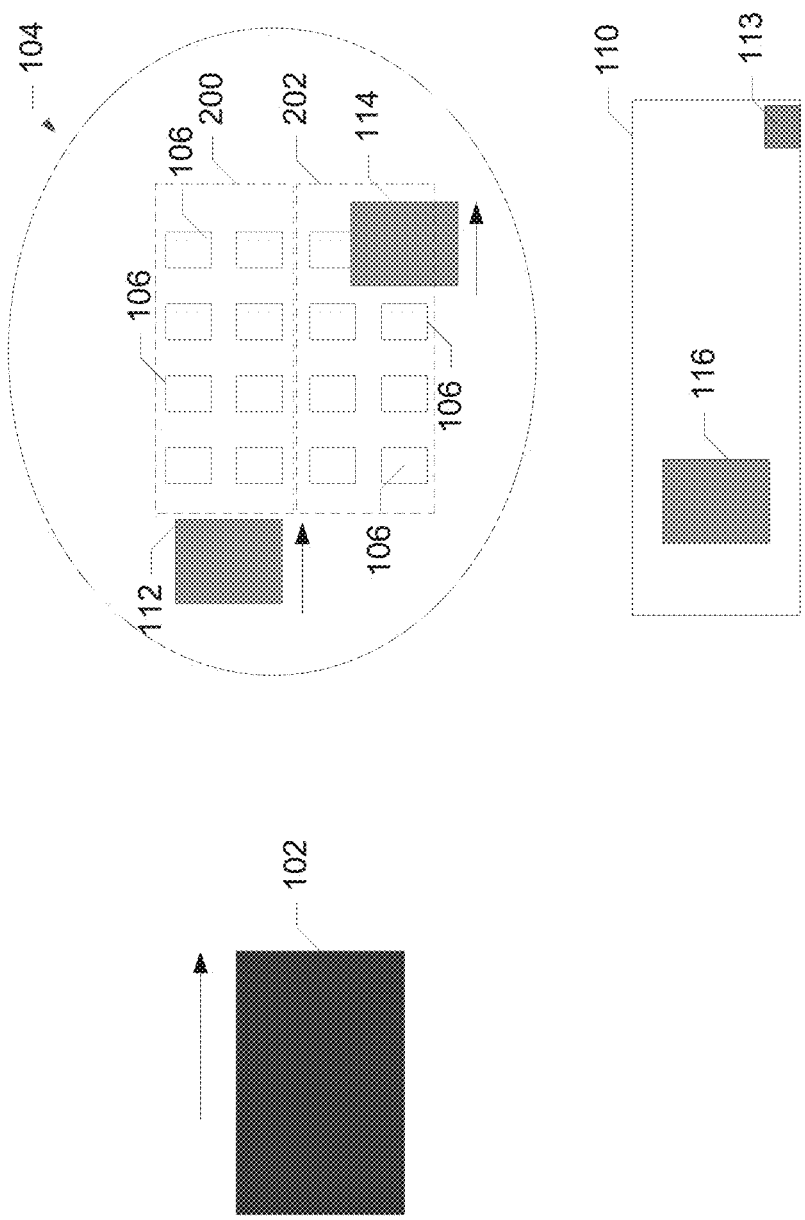
FIG. 2 is an aerial view of the example system of FIG. 1.

FIG. 2 is an aerial view of the example system 100 in the example environment of FIG. 1. As illustrated in FIG. 2, the vehicle 102 is to travel to area 104 to, for example, apply one or more treatment material(s) to the vegetation 106 and/or soil in the area 104. As illustrated in FIG. 2, one or more UAVs (e.g., UAVs 112, 114 can be deployed to survey the area 104 to generate the NDVI model(s) for the area 104 to be sprayed by the vehicle 102. For example, based on a size of the area 104 and the speed at which the data is needed, the first UAV 112 can fly over a first portion 200 of the area 104 and the second UAV 114 can fly over a second portion 202 of the area 104 (e.g., as represented by arrows in FIG. 2) to map or survey the respective first and second portions 200, 202. As discussed above, in some examples, the UAV controllers 119 of the first and second UAVs 112, 114 respectively communicate with the vehicle communicator 109 of the vehicle 102 to transmit sensor data and/or the NDVI model(s) for each of the first and second portions 200, 202 of the area 104 to the vehicle 102. In other examples, the first and second UAVs 112, 114 communicate the sensor data and/or the NDVI data between one another (e.g., via the respective UAV communicators 118) to transmit image or sensor data and/or NDVI data, and then transmit the complied image data to the vehicle. For example, the first UAV 112 can transmit the image or sensor data and/or the NDVI data for the first portion 200 of the area 104 to the second UAV 114, which can generate an NDVI model based on the data for the first and second portions 200, 202. In other examples, the first UAV 112 transmits a first NDVI model (and/or the underlying point cloud(s) used to generate such) for the first portion 200 to the second UAV 114, and the second UAV 114 combines the first NDVI model (and/or point cloud(s)) for the first portion 200 with a second NDVI model (and/or point cloud(s)) for the second portion 202. In some examples, each of the first and second UAVs 112, 114 transmit the respective sensor data, NDVI data, and/or NDVI models to the vehicle 102 and the vehicle 102 combines the data to generate a final NDVI model. In the example of FIG. 2, the first UAV 112 and the second UAV 114 fly at substantially the same height relative to the ground, which facilitates combining the data. In some examples, a height of one of the first UAV 112 or the second UAV 114 may be higher than the other based on a difference in elevation (e.g., a rolling field with different location at different elevations relative to sea level). In some such examples, the vertical distance between the UAV and the vegetation it is imaging is the same for all UAVs during data collection (although if the field is not level or the vegetation is not growing to different heights, the UAVs may be at different altitudes).

In some examples, the UAVs 112, 114, 116 fly according to a predetermined flight pattern or sequence based on for example, a size of the area 104 to be surveyed and a duration of time for which each UAV 112, 114, 116 can fly before running out of power. For example, as illustrated in FIG. 2, the third UAV 116 is at the base station 110 for charging (e.g., via the power source 113) while the first and second UAVs 112, 114 are flying. The third UAV 116 can be deployed for example, when the first UAV 112 returns to the base station 110 for charging to provide substantially continuous mapping and NDVI data generation. Alternatively, the UAVs 112, 114 may fly simultaneously and independently return to the base station 110 when a battery level of the corresponding UAV 112, 114 falling below a threshold.

Figure 3:
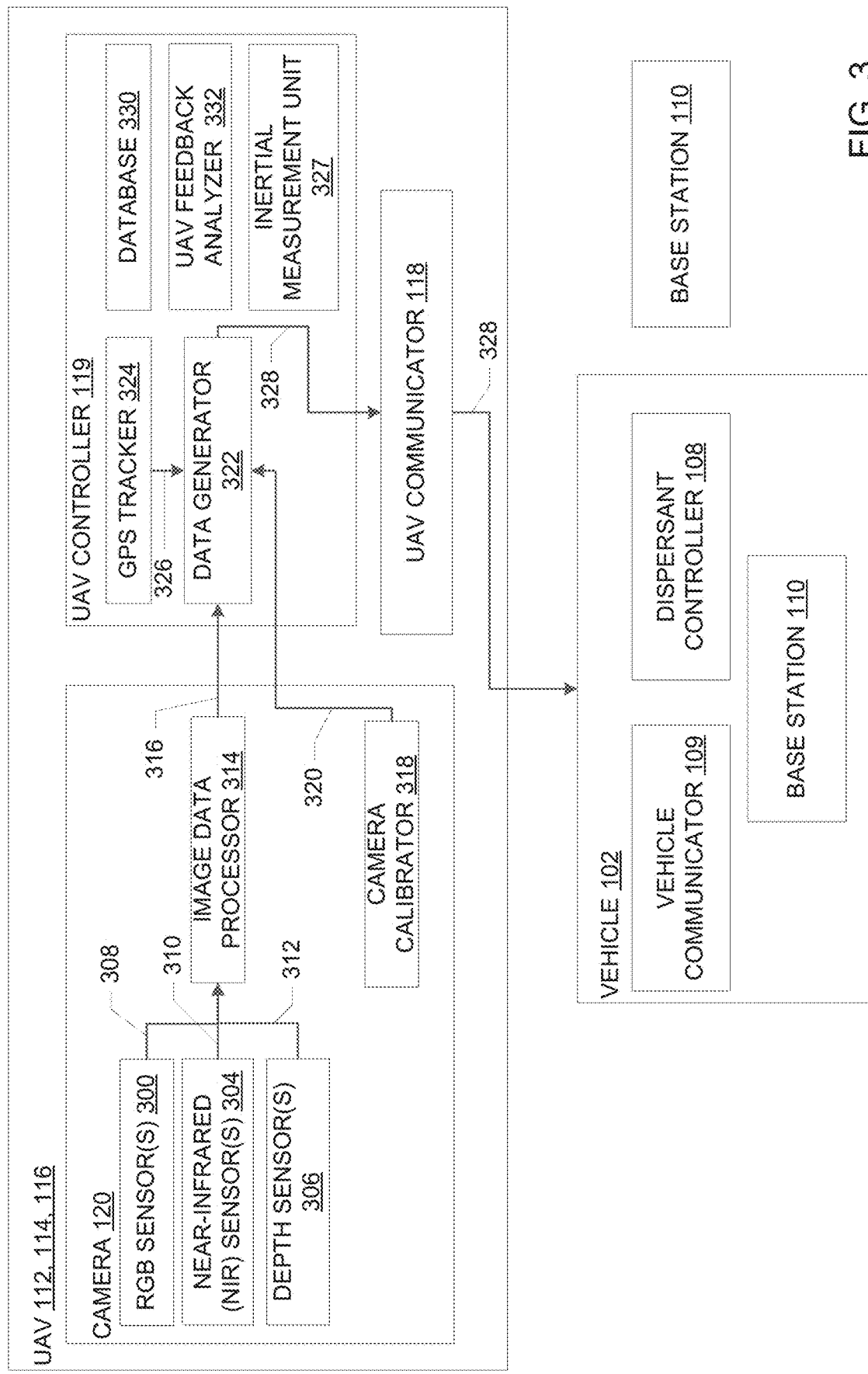
FIG. 3 is a block diagram of an example implementation of the example system of FIGS. 1 and 2.

FIG. 3 is a block diagram of an example implementation of the system 100 of FIGS. 1 and 2. As disclosed above in connection with FIGS. 1 and 2, the example system 100 can include one or more UAVs 112, 114, 116. Each of the example UAV(s) 112, 114, 116 includes a camera 120. In the example illustrated in FIG. 3, the example cameras 120 of each of the UAV(s) 112, 114, 116 include at least one red-green-blue (RGB) sensor 300, at least one near-infrared (NIR) sensor 304, and at least one depth sensor 306. In other examples, some or all of the UAVs may be equipped with one or more different cameras. The RGB sensor(s) 300 detect red, green, and/or blue wavelengths of light to generate RGB image data 308 as the UAV(s) 112, 114, 116 fly over the area 104. In some examples, NDVI data may be generated using a red sensor such that the green and blue components of the RGB sensor 300 may be omitted. The NIR (near-infrared) sensor(s) 304 detect near-infrared wavelengths of light to generate NIR image data 310 for the area 104. The depth sensor(s) 306 measure a distance of the camera 120 from a target, such as the ground of the area 104 or the vegetation 106 in the area 104 to generate depth data 312 for the area 104. In the example of FIG. 3, the RGB image data 308, the NIR image data 310, and the depth data 312 is processed by an image data processor 314 on board the camera of the corresponding UAV. Any of the RGB image data 308, the NIR image data 310, and the depth data 312 is generally referred to herein as sensor data.

The example image data processor 314 of FIG. 3 performs one or more data processing techniques on the RGB image data 308, the NIR image data 310, and/or the depth data 312. For example, the image data processor performs vignetting correction on the RGB image data 308 and/or the NIR data 310 to reduce brightness and/or saturation errors in the images. The image data processor 314 aligns the RGB image data 308, the NIR image data 310, and/or the depth data 312 to create aligned image data 316 containing 3-D coordinates (e.g., based on the image data collected in the X-Y plane and the depth data collected in the Z plane) and/or spectral channel values corresponding to the red, green, blue, and NIR wavelength values. In some examples, the aligned image data 316 is in the form of a tuple.

In some examples, the camera(s) 120 of the UAV(s) 112, 114, 116 each include a camera calibrator 318 as shown in FIG. 3. The camera calibrator 318 calibrates the RGB sensor(s) 300 and/or the NIR sensor(s) 304 of the corresponding camera 120 to determine a response of each sensor 300, 304 to spectral energy levels as a result of the reflection of light (e.g., sunlight) by the vegetation 106. The calibration process normalizes the data to smooth out any differences that might be presented in the sensor(s) used to collect the data due to manufacturing tolerance, age, etc. In some examples, the camera calibrator 318 uses previously collected image data (e.g., RGB image data, NIR image data) for the calibration. The camera calibrator 318 generates a configuration file 320 that contains a configuration state space such that a pixel of the RGB image data 308 and/or a pixel of the NIR image data 310 can be correlated to a spectral energy level measurement. The calibration of the RGB sensor(s) 300 and the NIR sensor(s) 304 normalizes data collected by the RGB sensor(s) 300 and the NIR sensor(s) 304 and, thus, enables alignment of the respective RGB image data 308 and the NIR image data 310. As will be discussed below in further detail, the spectral energy levels can be used to generate a vegetation index for one or more data points corresponding to geographical locations in the area 104.

The example camera calibrator 318 of FIG. 3 employs one or more equations to generate the configuration file 320 to relate (e.g., normalize) responses of the RGB sensor(s) 300 to spectral energy levels to responses of the NIR senor(s) 304 to those same spectral energy levels. For example, the example camera calibrator 318 of FIG. 3 can employ the following equations to analyze the responses of the RGB sensor(s) 300 and the NIR sensor(s) 304 and generate the configuration file 320 containing the configuration state spaces.

Where: n=the RGB sensor 300, the NIR sensor 304, or a channel of the respective sensors 300, 304 (e.g., red, green, blue, or near-infrared channel); $s_n(\lambda)$=spectral function of the sensor n; e $(\lambda)$=spectral function of an emitter (e.g., the sun or a light emitted by the camera 120); $r(\lambda)$=spectral function of a reflector (e.g., a plant or crop of the vegetation 106); $c_e$=emitter related scaling factor; $c_r$=reflector related scaling factor; $c_s$=sensor related scaling factor; $c_{config, n}$=scaling factor for configuration of a sensor (e.g., the RGB sensor 300, the NIR sensor 304) or channel of the respective sensors 300, 304; M=measured energy by the sensor (e.g., RGB sensor 300, the NIR sensor 304); and E=external measured energy; when, $$E_{config,n} = c_e c_r c_s \int_{\lambda_{min,n}}^{\lambda_{max,n}} e(\lambda) r(\lambda) s_n(\lambda) d\lambda \quad \text{(Eq. 1); and}$$

$$M_{config,n} = c_{config,n} c_e c_r c_s \int_{\lambda_{min,n}}^{\lambda_{max,n}} e(\lambda) r(\lambda) s_n(\lambda) d\lambda \quad \text{(Eq. 2); then}$$

$$M_{config,n} = c_{config,n} E_{s,n} \quad \text{(Eq. 3),}$$

where for $c_{config, rgb}$: $M_{config,blue}$=blue value of RGB sensor 300; $M_{config,green}$=green value of RGB sensor 300; $M_{config,red}$=red value of RGB sensor 300; and where for $c_{config, nir}$: $M_{config,nir}$=infrared value of NIR sensor 304.

To determine a correlation between the RGB sensor 300 and the NIR sensor 304, the example camera calibrator 318 finds all (Eq. 4):

$$a_{1 \to 2} = E_{n_1}/E_{n_2},$$

where $a_{1 \to 2}$ refers to a configuration of each of the RGB sensor 300 and the NIR sensor 304. To find the correlation between the RGB sensor 300 and the NIR sensor 304, the following equations can be employed by the camera calibrator 318:

$$\text{where } a_{1 \to 2} = E_{n_1}/E_{n_2} \quad \text{(Eq. 6); then}$$

$$a_{1 \to 2} = M_{config,n_1} c_{config,n_1}^{-1} / M_{config,n_2} c_{config,n_2}^{-1} \quad \text{(Eq. 6).}$$

In some examples, the camera configurations include constraints with settings or parameters of the camera 120 such as over-exposure or under-exposure of the images obtained by the camera 120 and/or other parameters such as gain. The camera calibrator 318 defines a configuration state space based on the analysis of Equation 1. For example, for the camera 120 containing the RGB sensor 300 and the NIR sensor 304 and a configuration of the camera 120 including p parameters, a configuration state space of the camera 120 can be defined as $\mathbb{R}^{2+2p}$.

As illustrated in FIG. 3, the example image data processor 314 transmits the aligned image data 316 to data generator 322 of the UAV controller 119 that is implemented to generate a three-dimensional NDVI model of the area 104 as described below. Also, the camera calibrator 318 transmits the configuration file 320 to the data generator 322. In the illustrated example of FIG. 3, the example data generator 322 processes the aligned image data 316 to generate a vegetation index for each data point in the aligned image data 316. Thus, in some examples, the data generator 322 is a landscape model generator. For example, the data generator 322 performs spectral leveling on the aligned image data 316 to scale or translate the pixel values of the aligned image data 316 (e.g., a tuple) to spectral measurements or energy levels measured by the RGB sensor(s) 300 and the NIR sensor(s) 304 as a result of the reflection of light (e.g., sunlight) by the vegetation 106. The example data generator 322 of FIG. 3 uses the configuration file 320 to correlate the pixel values of the RGB image data 308 and the NIR image data 310 with respect to spectral measurements. In other examples, the data generator 322 is implemented by a processor on the vehicle 102 and the UAV 112 forwards the image or sensor data thereto for the above processing.

Irrespective of where it is implemented, the example data generator 322 of FIG. 3 calculates a vegetation index for each pixel in the aligned image data 316. For example, the data generator 322 computes the vegetation index NDVI for a pixel based on the following equation:

NDVI=(NIR−VIS)/(NIR+VIS), where VIS is a spectral measurement collected by the RGB sensor 300 and NIR is a spectral measurement collected by the NIR sensor 304 (e.g., as determined based on the configuration file 320).

As disclosed above, in some examples, one or more of the first, second, and/or third UAVs 112, 114, 116 receives image data from one or more of the other UAVs (e.g., UAVs 112, 114, 116). For example, the first UAV 112 can receive image data from the second UAV 114 and/or the third UAV 116 (e.g., RGB image data, NIR image data, and/or depth data). The data received from the UAV(s) 114, 116 can include raw image data or pre-processed image data (e.g., data that has undergone vignetting correction at the second or third UAV 114, 116 before being transmitted to the first UAV 112). In such examples, the image data processor 314 and/or the data generator 322 of the first UAV 112 may perform one or more data processing operations on the image data received from the second UAV 114 and/or third UAV 116 with respect to the data 308, 310, 312. For example, the data generator 322 of the first UAV 112 can translate the pixel values of the image data received from the second and/or third UAVs 114, 116 to spectral measurements or energy levels to determine the vegetation indices corresponding to the portions of the area 104 captured by the second and/or third UAVs 114, 116. Thus, in some examples, the one of the UAVs 112, 114, 116 compiles data from the other UAVs and processes the compiled data to determine the vegetation indices.

Based on the vegetation indices calculated for the pixel values of the aligned image data 316, the data generator 322 (e.g., a landscape model generator 322) generates an NDVI map or model of the area 104 with respect to the amount and/or condition of the vegetation 106 in the area 104. The example UAV controller 119 of FIG. 3 includes a GPS tracker 324 that tracks a location of the UAV(s) 112, 114, 116 as the UAV(s) 112, 114, 116 fly over the area 104 to generate GPS data 326. The example UAV controller 119 of FIG. 3 may also include an inertial measurement unit (IMU) 327 that includes one or more sensors to generate IMU data corresponding to the linear acceleration of the UAV(s), the angular velocity of the UAV(s), and/or the magnetic field surrounding the UAV(s) (e.g., the earth's magnetic field). In some examples, the GPS data 326 and the IMU data are fused or combined to define the position, orientation, and six degrees of freedom of the UAV(s). The landscape model generator 322 correlates the vegetation indices based on the pixel image data of the camera(s) 120 and the GPS and IMU data to create an NDVI or vegetation landscape model 328 that visually depicts the vegetation indices for the vegetation 106 of the area 104. In some examples, the NDVI model is a point cloud or a 3-D model based on the generation of the depth data 312 by the camera(s) 120. In some examples, the NDVI model corresponds to multiple point clouds associated with different image data captured at different points in time. In some examples, the data generator 322 generates a 2-D map. The NDVI model 328 can be stored in a database 330 of the UAV controller 119.

As discussed above, in some instances, the data generator 322 of, for example, the first UAV 112 generates the NDVI model based on vegetation indices and GPS data received from the second UAV 114 and/or the third UAV 116. In other examples, the data generator 322 of the first UAV 112 receives NDVI models (e.g., 3-D point cloud image data) from the second UAV 114 and/or the third UAV 116 and combines the NDVI model(s) to generate an NDVI model for the area 104 and/or one or more portions thereof.

In the example shown in FIG. 3, the example data generator 322 transmits the NDVI model 328 to the UAV communicator 118. The example UAV communicator 118 wirelessly transmits the NDVI model 328 to the vehicle communicator 109 of the vehicle 102 (e.g., via WiFi, Bluetooth®, etc.). In other examples, the NDVI model is generated by the vehicle communicator 109. As disclosed above, the vehicle communicator 109 transmits the NDVI model 328 to the dispersant controller 108 of the vehicle 102 for display (e.g., via the GUI 111 of the vehicle 102) and/or analysis for controlling distribution of treatment material(s) via the vehicle 102. In some examples, the UAV communicator 118 transmits the NDVI model 328 of a given UAV when the UAV 112, 114, 116 is docked at the base station 110. As illustrated in FIG. 3, the base station 110 can be located at the vehicle 102 and/or a location separate from the vehicle 102.

In some examples, the image data 308, 310, the depth data 312, the GPS data 326, and/or the IMU data are used by the UAV controller 119 to determine a landing location of the UAV(s) 112, 114, 116 with respect to the base station 110 (FIG. 1). For example, a landing position for the UAV 112, 114, 116 at the base station 110 can be stored in the database 330. A 3-D image generated by the camera 120 can be correlated with the GPS data 326 as the UAV 112, 114, 116 returns to the base station 110 to more accurately identify a location of the UAV 112, 114, 116 relative to the landing position at the base station 110.

In some examples, the UAV controller 119 includes a UAV feedback analyzer 332 to detect patterns with respect to processing of the image data 308, 310, 316, the depth data 312, the IMU data, and/or the GPS data 326. The UAV feedback analyzer 332 can use one or more deep learning techniques to optimize processing of the data, the generation of the NDVI model 328, and/or the determination of the landing position of the UAV 112, 114, 116 with respect to the base station 110. In some examples, the UAV feedback analyzer 332 may alternatively be implemented in the vehicle 102. The vehicle 102 may not be part of the system. Instead, the vehicle communicator 109, the dispersant controller 108, and the base station 110 may be part of the system and sold for integration into the vehicle (e.g., as an after-market add-on).

While an example manner of implementing the example system 100 of FIGS. 1-2 is illustrated in FIG. 3, one or more of the elements, processes and/or devices illustrated in FIG. 3 may be combined, divided, re-arranged, omitted, eliminated and/or implemented in any other way. Further, the example dispersant controller 108, the example vehicle communicator 109, the example UAV(s) 112, 114, 116, the example, UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, the example IMU 327, the example database 330, the example UAV feedback analyzer 332 and/or, more generally, the example system 100 of FIGS. 1-3 may be implemented by hardware, software, firmware and/or any combination of hardware, software and/or firmware. Thus, for example, any of the example dispersant controller 108, the example vehicle communicator 109, the example UAV(s) 112, 114, 116, the example, UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, the example IMU 32, the example database 330, the example UAV feedback analyzer 332 and/or, more generally, the example system 100 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dispersant controller 108, the example vehicle communicator 109, the example UAV(s) 112, 114, 116, the example, UAV communicator(s) 118, the example UAV controller(s) 119, the example camera(s) 120, the example RGB sensor(s) 300, the example NIR sensor(s) 304, the example depth sensor(s) 306, the example image data processor 314, the example camera calibrator 318, the example data generator 322, the example GPS tracker 324, the example IMU 327, the example database 330, the example UAV feedback analyzer 332 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example system 100 of FIGS. 1-3 may include one or more elements, processes and/or devices in addition to, or instead of, those illustrated in FIGS. 1-3, and/or may include more than one of any or all of the illustrated elements, processes and devices.

Figure 4:
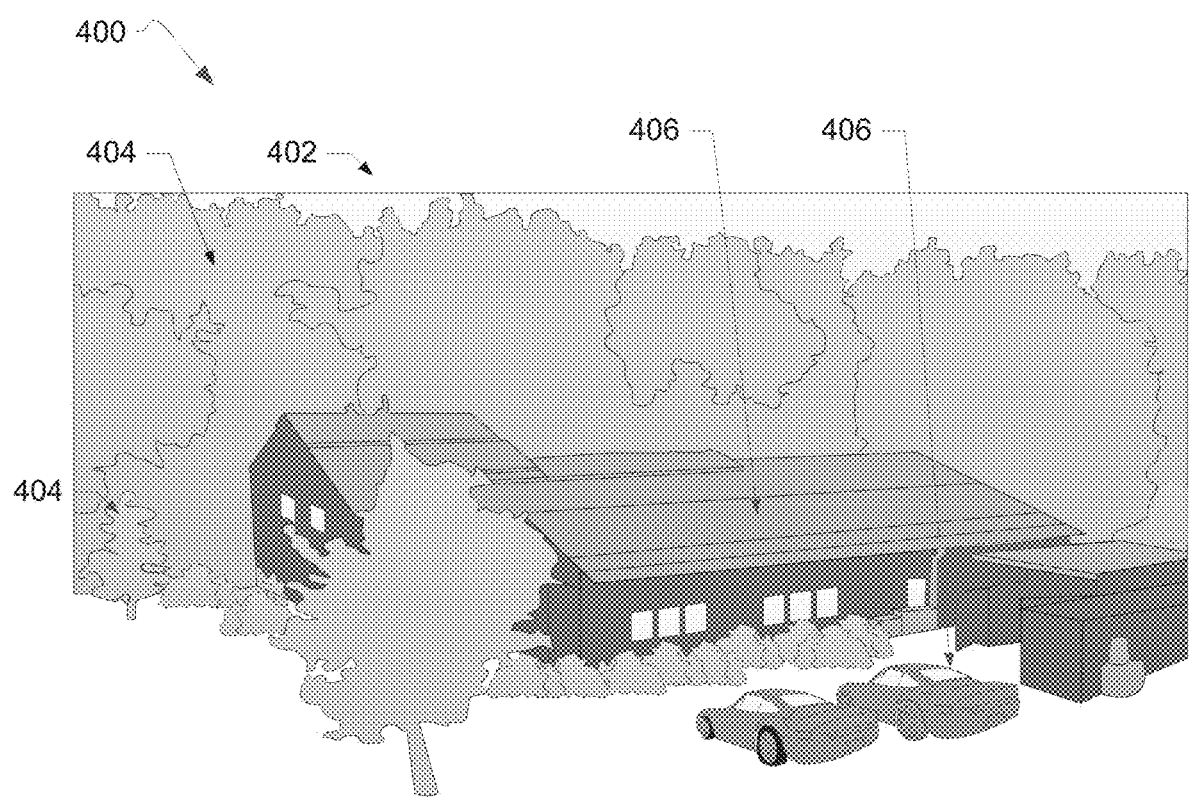
FIG. 4 is an illustration of an example NDVI model generated by the system of FIGS. 1-3.

FIG. 4 illustrates an example NDVI model 400 generated by the example data generator 322 of FIG. 3. As illustrated in FIG. 4, the example NDVI model 400 is a 3-D representation of an area 402. The NDVI model 400 includes one or more portions 404 shaded to indicate a presence of vegetation in the area 402 based on the spectral measurements obtained from the image data (e.g., the RGB image data 308, the NIR image data 310). The NDVI model 400 includes one or more portions 406 shaded to indicate an absence or low presence of vegetation in the area 402 (e.g., corresponding buildings in the area 402) based on a degree of light reflection or absorption in the portions 406.

Flowcharts representative of example machine readable instructions for implementing the example system 100 of FIGS. 1-3 are shown in FIGS. 5-8. In these examples, the machine readable instructions implement a program for execution by a processor such as the UAV controller 119 shown in the example processor platform 1500 discussed below in connection with FIG. 15. The program may be embodied in software stored on a non-transitory computer readable storage medium such as a CD-ROM, a floppy disk, a hard drive, a digital versatile disk (DVD), a Blu-ray disk, or a memory associated with the UAV controller 119, but the entire program and/or parts thereof could alternatively be executed by a device other than the UAV controller 119 and/or embodied in firmware or dedicated hardware. Further, although the example program is described with reference to the flowcharts illustrated in FIGS. 5-8, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-8 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 5:
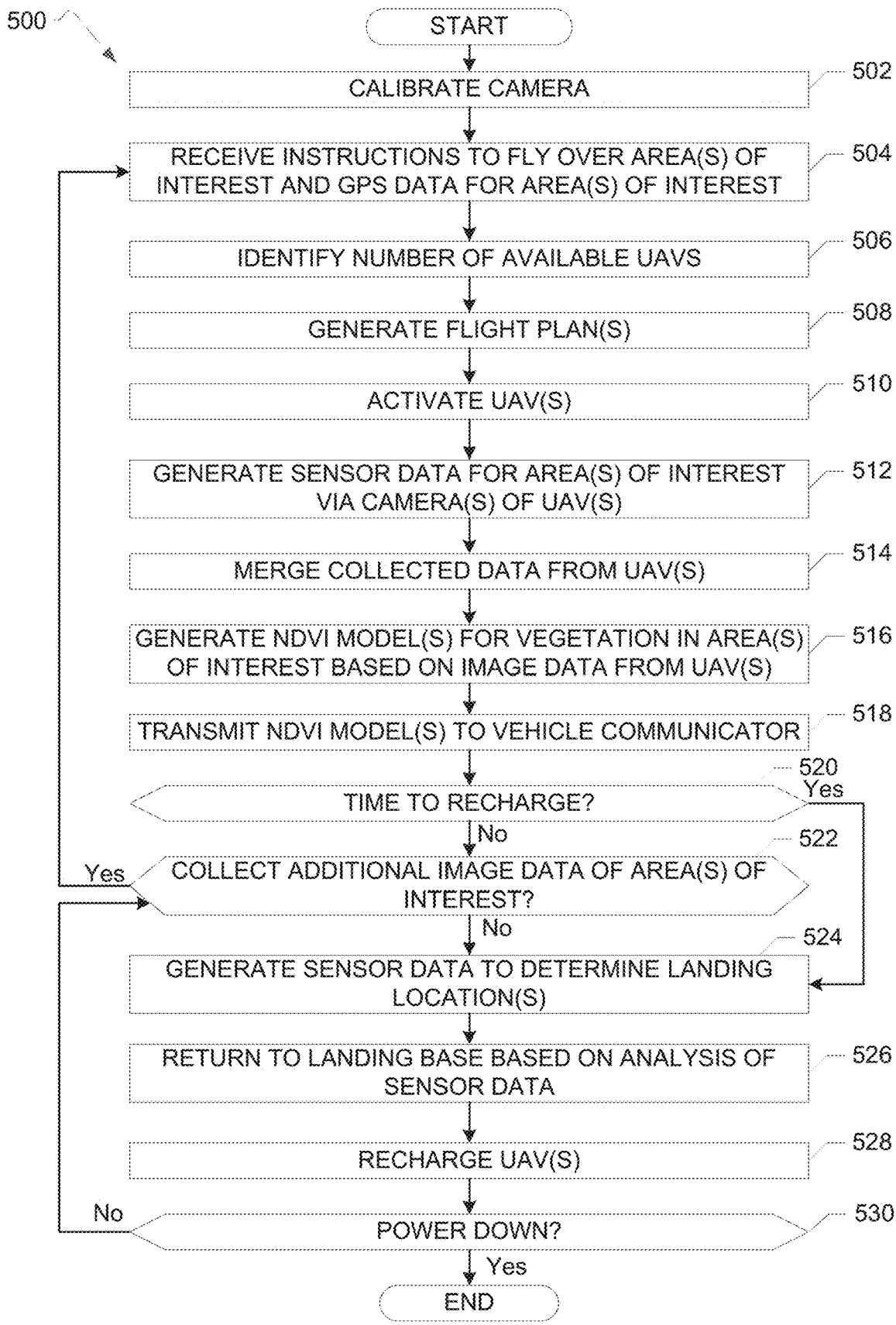
FIG. 5 is a flowchart representative of example machine readable instructions that may be executed to implement the example system of FIGS. 1-3.

FIG. 5 is a flowchart representative of example machine readable instructions 500 that, when executed, cause the example system 100 of FIGS. 1-3 to generate one or more NDVI or vegetation landscape model(s) (e.g., the NDVI model 328 of FIG. 3, which can include one or more point clouds). The example instructions of FIG. 5 can be executed in whole or in part by one or more of the dispersant controller 108 (e.g., of the vehicle 102), the image data processor 314 of the camera(s) 120 of any or all of the respective first, second, or third UAVs 112, 114, 116, and/or the UAV controller 119 of any or all of the respective first, second, or third UAVs 112, 114, 116 of FIGS. 1-3. In some examples, multiple instances of the instructions of FIG. 5 are executed in parallel by the same or different component(s) of the system.

In the example of FIG. 5, the camera calibrator 318 of the UAV 112, 114, 116 calibrates the camera 120 with respect to the RGB sensor(s) 300 and the NIR sensor(s) 304 (block 502). For example, the camera calibrator 318 applies one or more equations (e.g., Equations 1-6) to known image data generated by the RGB sensor(s) 300 and/or the NIR sensor(s) 304 to normalize the response of the RGB sensor(s) 300 and the NIR sensor(s) 304 with respect to spectral energy levels indicative of reflections of light emitted by an emitter (e.g., the sun) and reflected by a reflector (e.g., vegetation). The camera calibrator 318 generates the camera configuration file 320 that can be used to correlate the pixel data collected by the RGB sensor(s) 300 and the NIR sensor(s) 304 with spectral energy levels.

In the example of FIG. 5, the dispersant controller 108 of the vehicle 102 receives instructions for the UAV(s) to fly over one or more areas of interest (block 504). The instructions can include GPS coordinates for the area(s) of interest. In some examples, the instructions are received via one or more user inputs entered at the dispersant controller 108 via the GUI 111 of the vehicle 102. In other examples, the instruction(s) are sent to the UAV communicator 118 of the corresponding UAV(s) 112, 114, 116 by, for example, the vehicle communicator 109 of the vehicle 102. In such examples, the UAV communicator 118 relays the instruction(s) to the UAV controller 119 on board the respective UAV 112, 114, and/or 116.

Based on the instructions, the dispersant controller 108 and/or the UAV controller 119 of the UAV(s) identify a number of available UAVs (block 506). The UAVs 112, 114, 116 can be identified as available based on, for example, power level(s) (e.g., battery charge status) of the UAV(s), duration(s) of time that the UAV(s) have been docked at the base station 110, duration(s) of preceding flight(s) of the UAV(s), maintenance statuses of the UAV(s), etc. In some examples, the dispersant controller 108 and/or the UAV controller 119 identify the available UAV(s) based on a determination that a particular UAV has sufficient power to fly to and over at least some of the area(s) of interest, capture image data, and return to the base station 110.

In the example of FIG. 5, the dispersant controller 108 and/or the UAV controller 119 generate flight plan(s) for the available UAV(s) 112, 114, 116 (block 508). For example, based on the GPS data for the area(s) to be surveyed and the power charge status of the available UAV(s), the dispersant controller 108 and/or the UAV controller 119 generate flight plan(s) including the GPS coordinates of the area(s) of interest and/or portion(s) thereof to be covered by corresponding one(s) of the UAVs. For example, the dispersant controller 108 and/or the UAV controller 119 can determine that the first UAV 112 will survey the first portion 200 of the area 104 of FIG. 2 and the second UAV 114 will survey the second portion 202 of the area 104.

In the example of FIG. 5, the UAV controller 119 of the corresponding UAV(s) 112, 114, 116 that have been identified as available UAV(s) activates the corresponding UAV (block 510). In some examples, the UAV controller 119 activates the corresponding UAV 112, 114, 116 based on instructions received from the vehicle communicator 109 of the vehicle 102 and/or a UAV communicator 118 of another UAV. In some examples, activation of the UAV(s) 112, 114, 116 includes delivering the flight plan(s) to the corresponding UAV(s).

The activated UAV(s) 112, 114, 116 take off from, for example, the base station 110 and fly over the area(s) 104 according to the flight plan(s). The GPS tracker(s) 324 of the activated UAV(s) track location(s) of the UAV(s) during flight relative to the GPS data for the area(s). In some examples, the IMU(s) 327 of the activated UAV(s) generate IMU data corresponding to the linear acceleration of the UAV(s), the angular velocity of the UAV(s), and/or the magnetic field surrounding the UAV(s). The UAV(s) 112, 114, 116 generate sensor data of the area(s) 104 via their respective camera(s) 120 during flight (block 512). The sensor data can include image data and depth data. The image data can include pixel data generated by the sensor(s) 300, 304 of the camera(s) 120. The depth data includes measurements in the Z plane, such as a height of the camera(s) 120 of the UAV 112, 114, 116 relative to vegetation in the area(s) 104. The camera(s) 120 can be activated to generate image and/or depth data by the image data processor 314 of the camera(s) 120.

In some examples in which two or more UAVs are activated, the UAV controller 119 of one of the UAV(s) 112, 114, 116 merges (e.g., combines) the image data 308, 310 and the depth data 312 generated by the UAV(s) for the area(s) of interest (block 514). The data can be transmitted between the UAV communicators 118 of two or more UAV(s) via the wireless communication link(s) 121. In some examples, the UAV controller 119 of, for example, the first UAV 112 receives raw image data 308, 310 and raw depth data from one or more other UAV(s) 114, 116. In such examples, the UAV controller 119 of the first UAV 112 processes the data from the UAV(s) by filtering the data, correlating the image and/or depth data based on GPS data, etc. In some examples, the UAV controller 119 of, for example, the first UAV 112 receives pre-processed data (e.g., filtered data) from the other UAV(s) 114, 112. In such examples, the UAV controller 119 merges the pre-processed data with data collected and processed by the first UAV 112. In other examples, the UAV controller 119 of, for example, the first UAV 112 receives spectral measurement data generated by each UAV for the vegetation 106 based on the image data for the area(s) 104.

In other examples, the dispersant controller 108 of the vehicle 102 merges the data received from the UAV(s) 112, 114, 116 based on communication between the UAV communicator(s) 118 and the vehicle communicator 109 of the vehicle 102 (block 514). The raw and/or processed data (e.g., image data, spectral measurement data, etc.) can be transmitted between the UAV communicator(s) 118 of the UAV(s) and the vehicle communicator 109 via the wireless communication link(s) 117.

The location of block 514 merging the data generated by two or more UAVs in FIG. 5 can be different for different examples. In fact, the merging of data can occur at one or more different times in the example flow chart of FIG. 5, as discussed above.

In the example of FIG. 5, the UAV controller(s) 119 of the UAV(s) 112, 114, 116 generate the landscape models or NDVI model(s) 328 (e.g., point cloud(s)) of the vegetation 106 in the area of interest 104 based on the image data from the UAV(s) (block 516). For example, the image data processor(s) 314 of the camera(s) 120 process (e.g., filter)

the image data. The UAV controller(s) 119 analyze pixel values in the image data with respect to the reflection of light by the vegetation 106 in the area 104 (e.g., the reflection of visible and/or near-infrared light projected by the camera 120 or sunlight). The UAV controller(s) 119 calculate spectral reflectance measurements based on the pixels in the image data to generate NDVI data, or vegetation indices for the vegetation 106 in the area(s) of interest. The UAV controller(s) 119 generate NDVI or vegetation landscape model(s) 328 (e.g., 3-D point clouds) that visually depict the vegetation indices for the vegetation 106 of the area(s) 104 surveyed by the UAV(s) 112, 114, 116. In some examples, the UAV controller 119 of one of the UAV(s) 112, 114, 116 generates the NDVI model(s) based on data received from the other UAV(s). In some examples, the dispersant controller 108 of the vehicle 102 generates the NDVI model(s) based on the data received from the UAV(s).

In examples of FIG. 5 where the NDVI model(s) are generated by the UAV(s), the UAV communicator(s) 118 transmit the corresponding NDVI model(s) to the vehicle communicator 109 of the vehicle 102 (block 518). In some examples, the vehicle 102 is in the area of interest at substantially the same time as the UAV(s) 112, 114, 116 or at a distance from the area of interest at which the vehicle 102 and the UAV(s) 112, 114, 116 can communicate via wireless communication link(s) 117. For example, the UAV communicator(s) 118 transmit the NDVI model(s) to the vehicle communicator 109 in substantially real-time. In some examples, the vehicle communicator 109 transmits the NDVI model(s) to the dispersant controller 108 of the vehicle 102 for display and/or analysis with respect to a selection, location, and/or quantity of treatment material(s) to be applied to the vegetation 106 in the area 104. Thus, the dispersant controller 108 of the vehicle 102 receives data regarding the amount and/or condition (e.g., growth state) of the vegetation 106 in substantially real-time and can generate one or more instructions for application of the treatment material(s) based on current data. Further, in examples where the NDVI model(s) are 3-D model(s), the dispersant controller 108 can more accurately determine a location and/or height at which the treatment material(s) are to be applied to the vegetation 106.

The UAV controller(s) 119 of the corresponding UAV(s) 112, 114, 116 determine whether the UAV should be recharged (block 520). The decision as to whether the UAV 112, 114, 116 should be recharged can be based on, for example, a power level of the UAV, whether the treatment is finished, a power state of the vehicle 102, etc.

If the UAV(s) 112, 114, 116 do not need to be recharged, the corresponding UAV controller(s) 119 determine that whether or not to collect additional image data of the area(s) 104 via the camera(s) 120 of the UAV(s) 112, 114, 116 (block 522). If the UAV(s) 112, 114, 116 have not yet flown over all or substantially all of the area(s) 104 and collected image data of the defined area(s) 104 (e.g., based on the flight plan(s)), then control returns to block 504 to receive additional instructions to cause the UAV(s) to fly over the same or new area(s) of interest.

If a determination is made that one or more of the UAV(s) 112, 114, 116 should be recharged, or if a determination is made that no additional image data is needed for the area(s) of interest, then the camera(s) 120 of the corresponding UAV(s) 112, 114, 116 generate sensor data to determine a landing location of the corresponding UAV(s) 112, 114, 116 with respect to the base station 110 (block 524). For example, the UAV controller(s) 119 of the UAV(s) 112, 114, 116 can identify a location of the base station 110 from the image data, identify a height of the base station 110 from the depth data, etc. In some examples, the UAV controller(s) 119 of the UAV(s) 112, 114, 116 identify the location of the base station 110 based on one or more of the image data, the depth data, the GPS data 326 generated by the GPS tracker 324, and/or the IMU data 327 generated by the IMU 327.

In the example of FIG. 5, the UAV(s) 112, 114, 116 return to the base station 110 based on the analysis of the sensor data (block 526). Thus, the 3-D images generated by the camera(s) 120 can be used by the UAV controller(s) 119 to increase precision in the respective landing location(s) of the UAV(s) 112, 114, 116.

In the example of FIG. 5, the UAV(s) 112, 114, 116 are recharged at the base station 110 (block 528). Subsequently, the UAV controller 119 determines whether the UAV(s) 112, 114, 116 should be powered down (e.g., the vehicle is powered off which may indicate no additional image collection is desired in the immediate future) (block 530). If the UAV(s) 112, 114, 116 are not to be powered down, then control returns to block 522 to receive instructions for additional flyovers. If the UAV(s) 112, 114, 116 are to be powered down, then the example of FIG. 5 ends.

Figure 6:
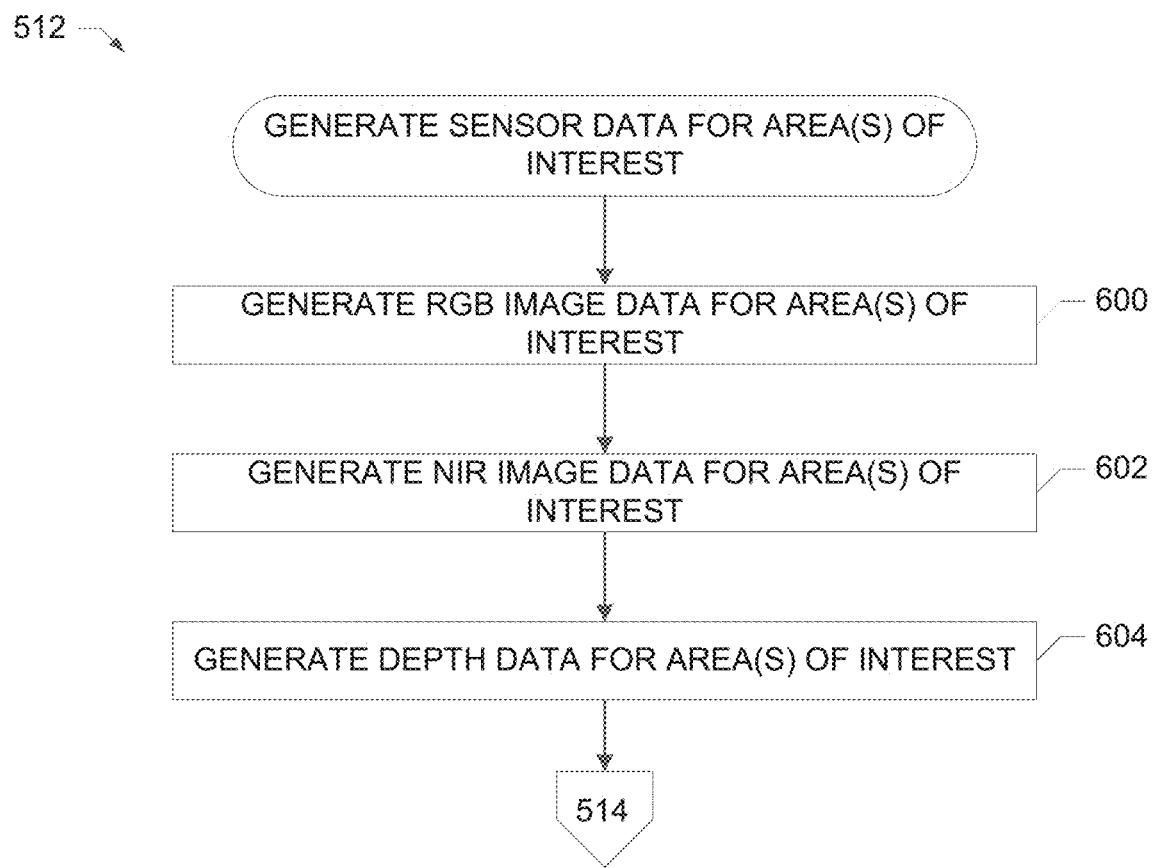
FIG. 6 is a flowchart representative of example machine readable instructions that may be executed to implement block 512 of FIG. 5.

FIG. 6 is a flowchart representative of example machine readable instructions that may be executed to implement block 512 of FIG. 5 to generate sensor data (e.g., image data, depth data) for one or more areas of interest (e.g., the area(s) 104 of FIGS. 1 and 2) via one or more UAV(s) (e.g., the UAV(s) 112, 114, 116) flying over the area(s). The example instructions 512 can be executed by the image data processor 314 of the camera(s) 120 of any of the UAV(s) 112, 114, 116. In some examples, multiple instances of the instructions of FIG. 6 are executed in parallel by the same or different component(s) of the system.

In the example of FIG. 6, the RGB sensor(s) 300 of the camera(s) 120 generate RGB image data of the area(s) of interest (block 600). The RGB sensor(s) 300 detect red, green, and/or blue wavelengths of light to generate RGB image data 308 as the UAV(s) 112, 114, 116 fly over the area(s) 104.

In the example of FIG. 6, the NIR sensor(s) 304 of the camera(s) 120 generate NIR image data of the area(s) of interest (block 602). The NIR sensor(s) 304 detect near-infrared wavelengths of light to generate NIR image data 310 for the area(s) 104 as the UAV(s) 112, 114, 116 fly over the area(s).

In the example of FIG. 6, the depth sensor(s) 306 generate depth data of the area(s) of interest (block 604). The depth sensor(s) 306 measure a distance of the camera 120 from a target, such as the ground of the area(s) 104 or the vegetation 106 in the area(s) 104 to generate depth data 312 for the area 104. After execution of block 604, control advances to block 514 of FIG. 5.

Figure 7:
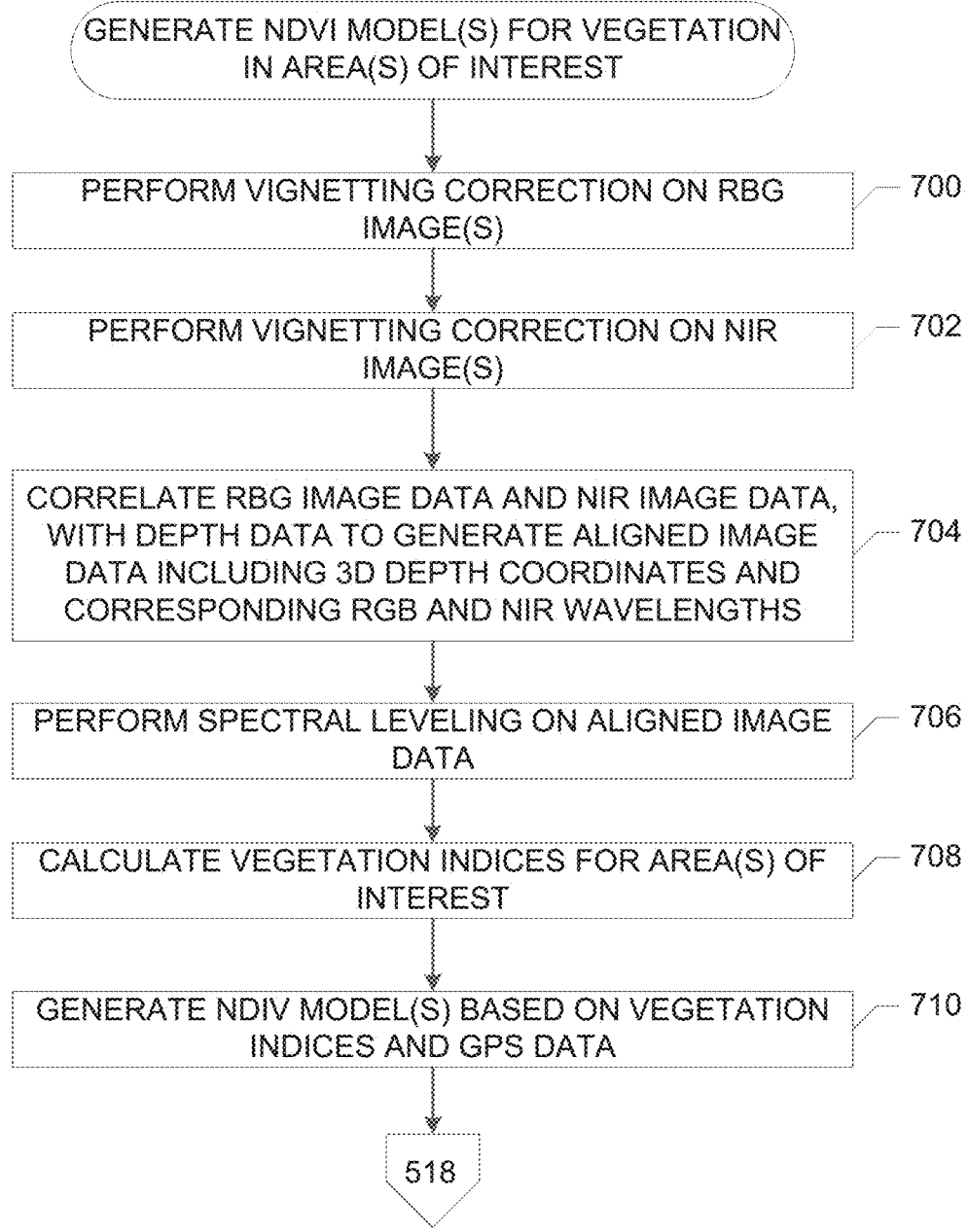
FIG. 7 is a flowchart representative of example machine readable instructions that may be executed to implement block 516 of FIG. 5.

FIG. 7 is a flowchart representative of example machine readable instructions that may be executed to implement block 516 of FIG. 5 to generate landscape model(s) (e.g., NDVI model(s)) for vegetation in one or more areas of interest (e.g., the vegetation 106 in the area(s) 104 of FIGS. 1 and 2). The example instructions 516 can be executed by one or more of the dispersant controller 108 (e.g., of the vehicle 102), the image data processor(s) 314 of the camera(s) 120 of any or all of the respective first, second, or third UAVs 112, 114, 116, and/or the UAV controller 119 of any or all of the respective first, second, or third UAVs 112, 114, 116 of FIGS. 1-3. For ease of discussion, the following assumes the instructions as implemented by the image data processor(s) 314 and the UAV controller(s) 119. In some examples, multiple instances of the instructions of FIG. 7 are executed in parallel by the same or different component(s) of the system.

The image data processor(s) 314 of the camera(s) 120 of the UAV(s) 112, 114, 116 perform one or more data processing techniques on the RGB image data 308 and the NIR image data 310. In the example of FIG. 7, the image data processor(s) 314 perform vignetting correction of the RGB image data 308 (block 700). In the example of FIG. 7, the image data processor(s) 314 perform vignetting correction of the NIR image data 310 (block 702). The vignetting correction of the image data 308, 310 can include reducing a brightness and/or saturation of the image data.

In the example of FIG. 7, the image data processor(s) 314 of the camera(s) 120 of the UAV(s) 112, 114, 116 correlate the RGB image data 308, the NIR image data 310, and the depth data 312 generated by the depth sensor(s) 306 (block 704). Based on the correlation, the image data processor(s) 314 generate aligned image data 316 that includes 3-D coordinate data (e.g., based on the image data collected in the X-Y plane and the depth data collected in the Z plane) and corresponding spectral channels, namely, red, green, blue, and NIR wavelength values for the coordinates.

In the example of FIG. 7, the data generator(s) 322 of the UAV controller(s) of the UAV(s) 112, 114, 116 perform spectral leveling on the aligned image data 316 (block 706). The data generator(s) 322 scale or translate the pixel values in the aligned image data 316 to spectral measurements or energy levels indicative of the reflection of visible or near-infrared light (e.g., sunlight) by the vegetation 106. In some examples, the data generator(s) 322 use the camera configuration file 320 generated by the camera calibrator(s) 318 of the corresponding camera(s) 120 to correlate the pixel values of the RGB image data 308 and the NIR image data 310 with spectral energy values.

In the example of FIG. 7, the data generator(s) 322 of the UAV controller(s) 119 of the UAV(s) 112, 114, 116 calculate vegetation indices for the area(s) of interest (block 708). For example, the data generator(s) 322 calculate vegetation indices for each pixel value in the aligned image data 316 based on the spectral measurements determined from the image data 308, 310 generated by the RGB sensor(s) 300 and the NIR sensor(s) 304.

In the example of FIG. 7, the data generator(s) 322 of the UAV controller(s) 119 of the UAV(s) 112, 114, 116 generate NDVI model(s) of the vegetation 106 in the area 104 based on the vegetation indices and the GPS data (block 710). The data generator(s) 322 correlate the vegetation indices based on the pixel image data of the camera(s) 120 and the GPS data to create one or more NDVI or vegetation landscape model 328 that visually depict the vegetation indices for the vegetation 106 of the area 104. In some examples, the data generator(s) 322 combine the GPS data with the IMU data generated by the IMU(s) 327 of the UAV(s) to define a position and/or orientation of the UAV(s). In such examples, the data generator(s) 322 correlate the vegetation indices based on the pixel image data of the camera(s) 120 and GPS and IMU data. The NDVI model(s) 328 can include 3-D or 2-D models. After completion of block 710, control advances to with block 518 of FIG. 5.

As discussed above, any of the example instructions 516 of FIG. 7 may be executed by the dispersant controller 108 of the vehicle 102. For example, the dispersant controller 108 can calculate the vegetation indices for the area(s) of interest and generate the NDVI model(s) based on processed image data received from the UAV(s).

Figure 8:
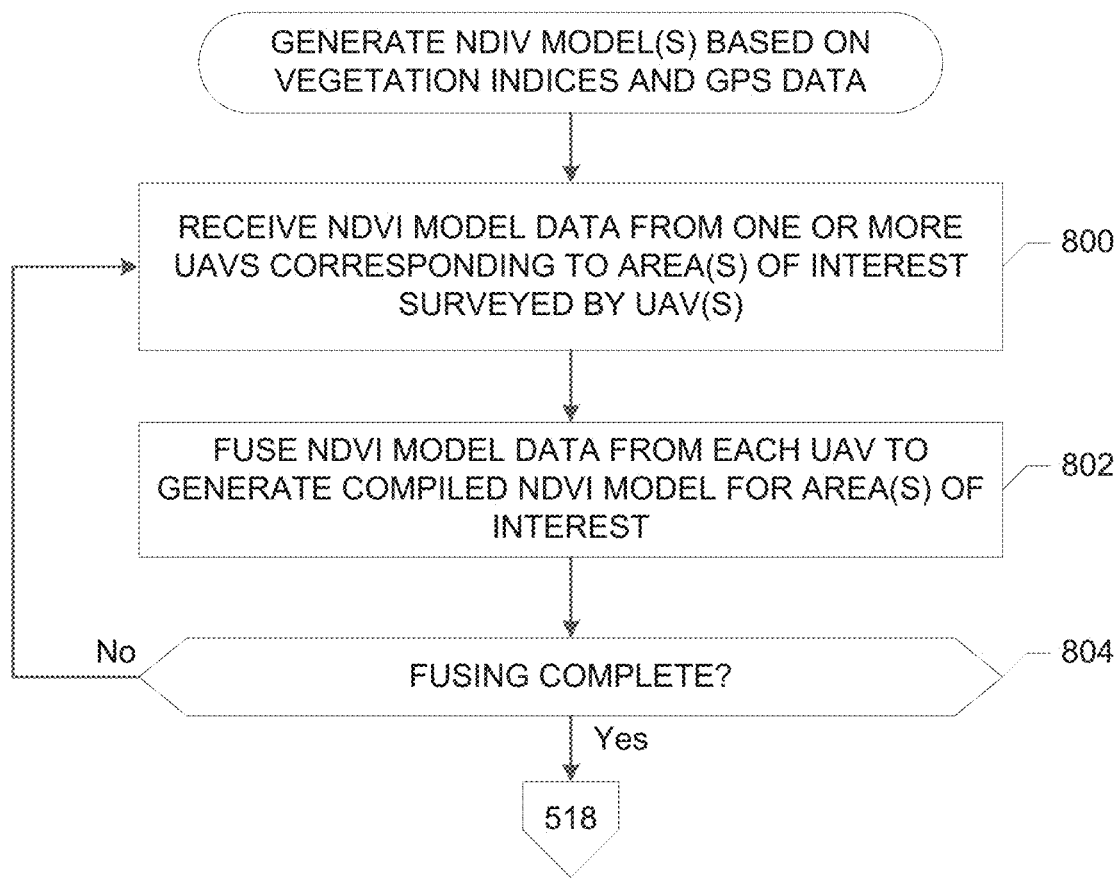
FIG. 8 is a flowchart representative of example machine readable instructions that may be executed to implement block 710 of FIG. 7.

FIG. 8 is a flowchart representative of example machine readable instructions that may be executed to implement block 710 of FIG. 7 to generate NDVI model(s) based on vegetation indices and GPS data. The example instructions 710 can be executed by the dispersant controller 108 (e.g., of the vehicle 102) and/or the UAV controller 119 of any or all of the respective first, second, or third UAVs 112, 114, 116 of FIGS. 1-3. For ease of discussion, the following assumes the instructions of FIG. 8 are executed in one or more of the UAV(s). In some examples, multiple instances of the instructions of FIG. 8 are executed in parallel by the same or different component(s) of the system.

In the example of FIG. 8, the UAV communicator 118 of one of the UAVs 112, 114, 116 receives NDVI model data from one or more other UAVs 112, 114, 116 corresponding to the area(s) of interest surveyed by the UAV(s) (block 800). The NDVI model data can include vegetation indices calculated by the UAV(s) 112, 114, 116 that can be used to create one or more point clouds, or visual representations of the vegetation indices in the area(s) 104. In other examples, the NDVI model data includes point cloud image data (e.g., 3-D image data) generated by the UAV(s) 112, 114, 116. For example, the second UAV 114 can be activated to survey the second portion 202 of the area 104 (e.g., based on the flight plan determined in FIG. 5). The NDVI model data can include GPS data and/or IMU data indicative of a position and/or orientation of the UAV(s) when the corresponding image data was collected. The UAV communicator 118 of the first UAV 112 can receive NDVI model data from the second UAV 114 corresponding to image data collected by the second UAV 114 for the second portion 202 of the area 104 of FIG. 2. The data can be transmitted between the UAV(s) 112, 114, 116 via one or more wireless transmission protocols.

The data generator 322 of the UAV 112, 114, 116 fuses the received NDVI model data from the UAV(s) 112, 114, 116 to generate an NDVI model (e.g., a 3-D point cloud) for the area of interest (block 802). More specifically, in some examples, the data generator 322 combines the NDVI model data corresponding to different portions of an area 104 (e.g., the portions 200, 202) to generate an NDVI model for all or substantially all of the portions of the area 104 over which the UAV(s) 112, 114, 116 fly. For example, the data generator 322 of the UAV designated to perform the fusing (e.g., UAV 114) may take a median or average of the vegetation indices determined by the respective UAV(s) 112, 114, 116 to generate the NDVI model. In other examples, the data generator 322 may average pixel values in point cloud image data generated by the UAV(s) 112, 114, 116 that correspond to shared coverage portion(s) of the area 104, etc.

At block 804, the data generator 322 determines whether fusing of the NDVI model data is complete. If fusing is not complete, control returns to block 800 to continue receiving and fusing NDVI model data. When fusing is complete, the example instructions of FIG. 8 end and control returns to block 518.

Although the example instructions 710 of FIG. 8 are discussed above as implemented by a UAV controller 119 of one of the UAV(s) 112, 114, 116, one or more of the instructions of FIG. 8 can alternatively be implemented by the example dispersant controller 108 of the vehicle 102 of FIG. 1 and/or in other one(s) of the UAV(s). For example, the UAV(s) 112, 114, 116 can transmit the NDVI model data (e.g., vegetation indices, GPS data, IMU data, 3-D point cloud image data) to the dispersant controller 108 (e.g., in substantially real-time as the data is generated) from the respective UAV(s). The dispersant controller 108 can fuse the data received from the UAV(s) to generate NDVI model(s) at the vehicle 102. Thus, in some examples, data generated by the UAV(s) is consolidated at the vehicle 102.

Figure 9:
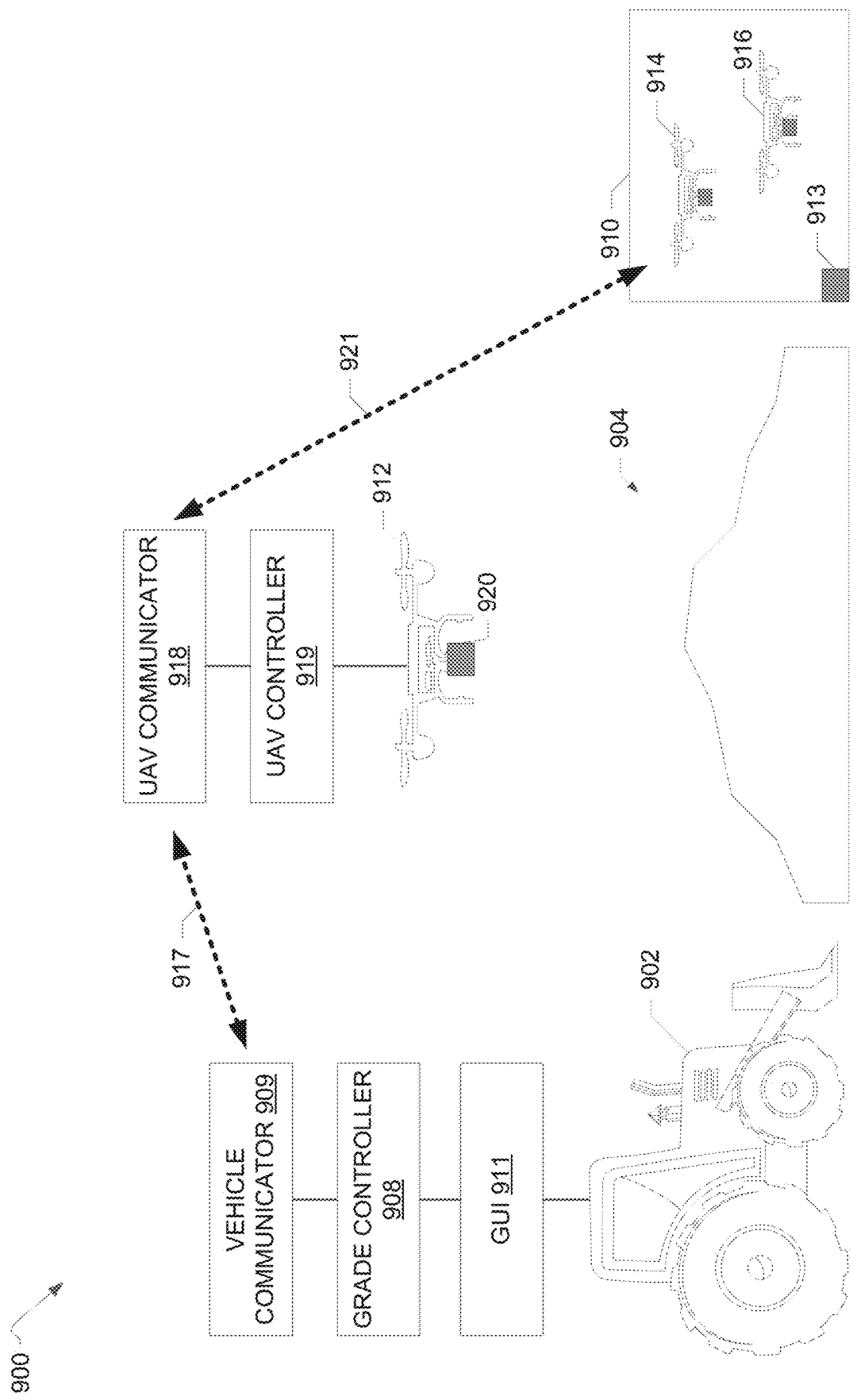
FIG. 9 illustrates another example system constructed in accordance with the teachings disclosed herein and located in another example environment of use.

FIG. 9 illustrates another example system 900 constructed in the accordance with the teachings of this disclosure and shown in an example environment of use. The example system 900 of FIG. 9 generates elevation data with respect to an area of land in the environment. The system transfers the data to a controller substantially in real-time to facilitate excavation and/or grading of the land. The example of FIG. 9 includes a vehicle 902 capable for performing excavation and/or grading of land. The example vehicle 902 is equipped with one or more apparatus to perform the excavation and/or grading (e.g., a bulldozer blade). In some examples, the vehicle is a bulldozer or other heavy equipment vehicle. In the example of FIG. 9, the vehicle 902 excavates and/or grades an area 904 of the environment. The area 904 can be, for example, an area of land such as a construction site for a building or other infrastructure (e.g., a road, a parking lot, etc.). In some examples, areas of the land that are not to be excavated and/or graded are not included in the area 904.

The example of FIG. 9 includes a grade controller 908. The grade controller 908 may be installed in the vehicle or remote from the vehicle 902. The grade controller 908 of this example controls excavation and/or grading equipment of the vehicle 902 (e.g., a bulldozer blade). For example, the grade controller 908 sends signals to the vehicle 902 and/or one or more components of the vehicle (e.g., actuators) to set and/or adjust a position of a vehicle tool such as a bulldozer blade of the vehicle 902. The example of FIG. 9 also includes a vehicle communicator 909 to receive data that is wirelessly transmitted to the vehicle communicator 909 via one or more protocols, such as Wi-Fi, BLE, a wireless communication protocol such as LTE, and/or ultra-wide band radio technology. The vehicle communicator 909 may be installed into the vehicle 902 and/or installed in the grade controller 908. A user of the vehicle 902 may interact with the grade controller 908 and/or view data received by the vehicle communicator 909 via a graphical user interface (GUI) 911 displayed via a screen in the vehicle 902.

The example system 900 of FIG. 9 includes a base station 910. In the illustrated example, the base station 910 is substantially the same or similar to the example base station 110 described above in connection with FIGS. 1-3. Thus, the example base station serves as a landing, storage, and/or power charging area for one or more UAVs. As illustrated in FIG. 9, the example system 900 also includes a first UAV 912, a second UAV 914, and a third UAV 916. In other examples, the system 900 may include additional or fewer UAVs. The UAVs 912, 914, 916 may be substantially similar to the UAVs 112, 114, 116 described above in connection with FIGS. 1-3. Thus, in the example system 900, the UAVs 912, 914, 916 take off from the base station 910 and fly over the area 904 to collect image data. The UAVs 912, 914, 916 generate landscape data and transmit the landscape data to the vehicle communicator 909 at the vehicle 902 substantially in real-time via a wireless communication link 917. In some examples, the landscape data includes an elevation map of the area 904 prior to grading by the vehicle 902. In some examples, the landscape data may include an elevation map of the area 904 after the vehicle 902 has graded some or all of the area 904. The UAVs 912, 914, 916 return to the base station 910 for power charging and/or storage as needed. In some examples, the base station 910 is located within or proximate to the area of interest 904 (e.g., within a flight distance of the area 904 such that the UAVs can fly to the area, collect the image data, and return to the based station on a single charge of battery power). In other examples, the base station 910 is coupled to the vehicle 902 (e.g., a rear portion or a front portion of the vehicle 102) such that the UAV(s) 912, 914, 916 take off from and land on the vehicle 902. The base station 910 of FIG. 9 includes a power source 913 (e.g., a battery) for charging the UAVs 912, 914, 916.

In the example system 900, a user of the vehicle 902 defines the area 904 or portion(s) thereof over which the UAV(s) 912, 914, 916 are to fly via one or more inputs to the grade controller 908 of the vehicle 902. For example, the user can input geographical coordinates of the area 904 via the GUI 911. In other examples, the area 904 is defined based on remotely entered user inputs and/or based on global positioning system (GPS) data collected via a GPS tracker of the vehicle 902. Data identifying the area 904 that is received by the controller 908 of the vehicle 902 is wirelessly transmitted to, for example, the first UAV 912 via the vehicle communicator 909 of the vehicle 902. In some examples, data identifying the area 904 is transferred to two or more of the UAVs 912, 914, 916 based on a size of the area 904 to be surveyed and the distance(s) that can be covered by the UAV(s) 912, 914, 916 before the UAV(s) 912, 914, 916 need to be recharged (e.g., multiple UAVs may be utilized to cover non-overlapping portions of the area 904). In some examples, two more of the UAVs may be instructed to survey the same portion of the area 904 but from different angles. For example, the first UAV 912 may survey the area 904 from above while the second UAV 914 may survey the same area 904 from a side (e.g., at an angle). In this manner, different perspectives of the same portion(s) of the area 904 may be captured and combined to generate better 3-D models of the landscape, including changes in elevation. Some UAV(s) may be surveying while others are charging.

In the example system 900 of FIG. 9, each of the UAVs 912, 914, 916 includes a UAV communicator 918, which may be the same as or substantially similar to the UAV communicator 118 described above in connection with FIGS. 1-3. Each of the UAVs 912, 914, 916 also includes a controller (e.g., a processor) 919 installed thereon. For illustrative purposes, the communicator 918 and the controller 919 are shown in FIG. 9 with respect to the first UAV 912 with the understanding that the example second and third UAVs 914, 916 also include a communicator and a controller similar or identical to the respective communicator 918 and the controller 919. Continuing to refer to the first UAV 912 for ease of discussion, the example UAV communicator 918 of the first UAV 918 relays data (e.g., GPS coordinates) identifying the area 904 to the controller 919. The example controller 919 onboard the first UAV 912 controls the UAV 912 to take off from the base station 910 and fly over the area 904. In some examples, the controller 919 causes the first UAV 912 to fly over the area 904 at an identified height based on data received from the vehicle 902 with respect to, for example, a height (e.g., elevation) of the area 904 (e.g., the controller 919 instructs the first UAV 912 to use its sensors to maintain a vertical height of approximately 30 feet (e.g., +/−6 inches) above the area 904 while travelling over the terrain of the area 904, which may vary in its elevation).

In the example system 900 of FIG. 9, each of the UAVs 912, 914, 916 includes one or more camera(s) 920 coupled thereto that may be the same as or similar to the camera 120 described above in connection with FIGS. 1-3. For illustrative purposes, the camera 920 is shown in FIG. 9 with respect to the first UAV 912 with the understanding that the example second and third UAVs 914, 916 also include camera(s) similar or identical to the camera 920. As the UAV(s) 912, 914, 916 fly over the area 904, the camera(s) 920 of the UAV(s) 912, 914, 916 generate sensor data (e.g., image data, depth data) by capturing one or more images of the area 904 and/or determining a height of the UAV relative to the terrain in the area 904. In some examples, the camera(s) 920 generate image data in the X, Y, and Z planes. In some examples, the camera(s) 920 captures a plurality of images corresponding to a field of view of the camera(s) 920 based on a frame rate and/or frequency of the camera(s) 920. In some examples, the camera(s) 920 capture a plurality of images at different angles as the corresponding UAV(s) 912, 914, 916 fly over the area 904. In some examples, the UAV(s) 912, 914, 916 collect data within a time period occurring before the vehicle 902 passes through the area 904 to grade the land. Any appropriate time frame may be used as the time period (e.g., less than 5 minutes, less than 1 minute). In some examples, the UAV(s) 912, 914, 916 collect data at the same time that the vehicle 902 is grading the area. In some examples, the UAV(s) 912, 914, 916 collect data associated with the area 904 before, during, and/or after the vehicle 902 has completed a grading operation.

In some examples, the first UAV 912, for instance, collects data specific to portion(s) of the area 904 that has not been graded by the vehicle 902 while a separate UAV (e.g., the second UAV 914) collects data specific to portion(s) of the area 904 that have been graded by the vehicle 902. In some such examples, the controller 919 of the first UAV 912 maintains the first UAV 912 in a leading position in front of a direction of travel of the vehicle 902 by a specified distance while the controller 919 of the second UAV 914 maintains the second UAV 914 in a trailing position behind the vehicle 902 by a specified distance.

In the example system 900, the respective UAV controllers 919 of the UAVs 912, 914, 916 generate landscape data based on sensor data collected by the camera(s) 920 as the respective UAVs 912, 914, 916 fly over the area 904. For example, the UAV controller 919 stores and processes the depth data collected by the camera 920 of first UAV 912 as the first UAV 912 flies over the area 904. The example UAV controller analyzes the depth data to determine an elevation of the ground of the area 904. In some examples, the UAV controller 919 of the first UAV 912 stores and processes image data collected by the camera 920 of the first UAV 912 as the first UAV 912 flies over the area 904. In such examples, the example UAV controller 919 of this example analyzes the collected camera image data on a pixel-by-pixel basis to determine an elevation of the ground of the area 904 (e.g., in conjunction with the depth data). The UAV controller 919 uses the calculated elevation of the ground to create a three-dimensional landscape model or elevation map of the area 904. Additionally or alternatively, in some examples, the sensor data collected by the UAVs 912, 914, 916 are transmitted to the vehicle 902 for subsequent processing including the generation of an elevation map.

In some examples, the landscape model or elevation map is constructed based on a plurality of elevation maps combined together. The plurality of elevation maps may be based on sensor data collected of some or all of the area 904 by the camera(s) 920. In some examples, sensor data (e.g., raw image data, depth data) is transmitted from one or more UAVs to another UAV for processing via, for example, a wireless communication link 921 between the UAV communicators 918 of the respective UAVs. For example, the second UAV 914 and/or the third UAV 916 can transmit sensor data collected by their respective cameras 920 to the first UAV 912. In such examples, the sensor data from the second UAV 914 and/or the third UAV 916 is processed by the UAV controller 919 of the first UAV 912 (e.g., in conjunction with the sensor data collected by the first UAV 912). In some such examples, the UAV controller 919 of the first UAV 912 averages or takes a median of the pixel data and/or depth data collected by the first, second, and/or third UAVs 912, 914, 916 for the overlaying portion(s) of the area 904 to generate the elevation map. In some examples, the UAV controller 919 of the first UAV 912 filters the sensor data to reduce noise and/or remove outliers and/or other anomalies in the sensor data. The UAV controller 919 of the first UAV 912 can apply one or more data processing techniques to analyze the depth data, the image data and/or the landscape data generated therefrom as part of creating the landscape model or elevation map. As explained above, in some examples, this sensor data processing may alternatively be implemented onboard the vehicle 902.

In other examples, the respective UAV controllers 919 of the UAVs 912, 914, 916 process the sensor data generated by their cameras 920 (e.g., by the camera(s) 920 of the corresponding UAV 912, 914, 916). For example, the UAV controller 919 of the second UAV 914 can process the sensor data collected by the camera 920 of the second UAV 914 by filtering the data as substantially discussed above in connection with the first controller 919 of the first UAV 912. In some such examples, the second UAV 914 transmits the filtered sensor data to another UAV, such as the first UAV 912. In such examples, the UAV controller 919 of the first UAV 912 generates the landscape model based on the filtered sensor data (e.g., image data, depth data) received from the second UAV 914, the sensor data collected by the first UAV 912, and sensor data received from any other UAVs (which may or may not be filtered). In some examples, the UAVs (e.g., the second UAV 914) also transmits GPS data corresponding to the (raw or processed) sensor data to the first UAV 912 such that the sensor data is correlated to the GPS location(s). In some examples, the sensor data is correlated with IMU data generated by the UAVs.

In some other examples, the UAV controller 919 of, for instance, the second UAV 914 generates landscape data (e.g., elevation data) based on the sensor data collected and processed by the second UAV 914. In some such examples, the second UAV 914 transmits the landscape data to the first UAV 912. The controller 919 of the first UAV 912 generates a landscape model or elevation map based on (1) the landscape data received from the second UAV 914, (2) the landscape data generated by the UAV controller 919 of the first UAV 912 based on sensor data collected by the first UAV 912, and (3) landscape data received from any other UAVs.

In other examples, the UAV controller 919 of, for instance, the second UAV 914 generates a landscape model or elevation map based on the landscape data generated by the second UAV 914. In some such examples, the second UAV 914 transmits the landscape model (e.g., 2-D or 3-D image data) to the UAV controller 919 of the first UAV 912. In such examples, the UAV controller 919 of the first UAV 912 fuses (e.g., merges or combines) the landscape model data from the various other UAVs 912, 914, 916 to generate a landscape model or elevation map for the area 904. The landscape models received from each UAV can correspond to different portions of the area 904, overlapping portion(s) of the area 904, and/or the same portion(s) of the area 904 depending on the scope of flight coverage by each UAV 912, 914, 916. In examples where the landscape model(s) correspond to the same or overlapping portions of the area 904, the UAV controller 919 of the first UAV 912 can selectively use data from one of the UAVs or average or take a median of the landscape model data (e.g., 2-D or 3-D image data) to generate the combined landscape model. Thus, the UAVs 912, 914, 916 of the example system of FIG. 9 work in concert to generate a landscape model or elevation map for the area 904 and/or one or more portions of the area 904. For example, the UAVs 912, 914, 916 may form a mesh network to consolidate data and deliver the consolidated data to the vehicle 902 for use and/or further processing.

In the example system 900 of FIG. 9, the vehicle 902 is within a range of the area of interest 904 or in the area of interest 904 at substantially the same time as the UAV(s) 912, 914, 916 such that the vehicle communicator 909 can communicate with the UAV communicator(s) 918. In the example system 900 of FIG. 9, the elevation map(s) are wirelessly transmitted from the UAV communicator 918 of the first UAV 912 (or any of the other UAVs) to the vehicle communicator 909 of the vehicle 902 substantially in real-time. In some examples, the UAV communicator 918 may compress the elevation map(s) prior to transmission. As discussed above, the UAV(s) can fly ahead of the vehicle 902 relative to a direction of travel of the vehicle 902 in the area 904. Thus, the UAV(s) 912, 914, 916 collect sensor data for the area 904 that has not yet been graded or excavated by the vehicle 902. In the illustrated example, the vehicle communicator 909 delivers the elevation map(s) to the grade controller 908. In some examples, the grade controller 908 displays the elevation map(s) via the GUI 911 of the vehicle 902. In some examples, the grade controller 908 compares the elevation map(s) to a desired elevation (e.g., based on construction plans) and displays results of comparison via the GUI 911. In some examples, the grade controller 908 analyzes the elevation map(s) generated by the UAV(s) 912, 914, 916 and generates one or more instructions to be performed by the vehicle 902 with respect to grading, excavating, or otherwise landscaping the area 904. For example, the grade controller 908 sets and/or adjusts the grade of the vehicle 902 to precisely control the amount of dirt, gravel, and/or other material to be moved by the vehicle 902. As disclosed above, in some other examples, the grade controller 908 generates the elevation map based on landscape data (e.g., image data, depth data, elevation data) or landscape model(s) received from one or more of the UAVs 912, 914, 916 by combining, consolidating, or fusing the data. In other examples, the grade controller 908 analyzes the landscape model(s) (e.g., elevation map(s)) received from the UAV(s) independent of one another (e.g., in examples where the landscape data from each UAV corresponds to a different portion of the area 904). In some examples, the data collected by the UAVs is combined into one landscape model for delivery to the vehicle by one UAV. In some examples, the landscape data generated by one UAV (e.g., the second UAV 914) is transmitted to the first UAV 912, which relays the landscape data to the vehicle communicator 909. Thus, in some examples, one of the UAVs 912, 914, 916 acts a hub for consolidating and/or delivering the data.

Thus, the example system 900 provides for enhanced landscape data in the form of 3-D elevation map(s) generated by one or more UAVs and transmitted substantially in real-time to the vehicle 902. As a result, the vehicle 902 receives substantially real-time information about the elevation of the area 904 without the delay and costs of engineers manually surveying the area 904. Furthermore, the elevation map(s) may have a resolution approximately corresponding to the resolution of the camera(s) 920, which is a substantial improvement over the resolution resulting from manual land surveys. Thus, the 3-D elevation map(s) enables increased precision in setting the grade of the vehicle in much less time than using traditional methods.

After the UAV(s) 912, 914, 916 survey the area 904 (or while some of the UAVs continue to survey), one or more of the UAV(s) 912, 914, 916 return to the base station 910 for storage and/or power savings. The respective UAV controller(s) 919 of the UAV(s) 912, 914, 916 can analyze image data generated by the camera(s) 920 of the corresponding UAV(s) to identify landing location(s) for the UAV(s) as discussed above with respect to the base station 110 of FIG. 1.

Figure 10:
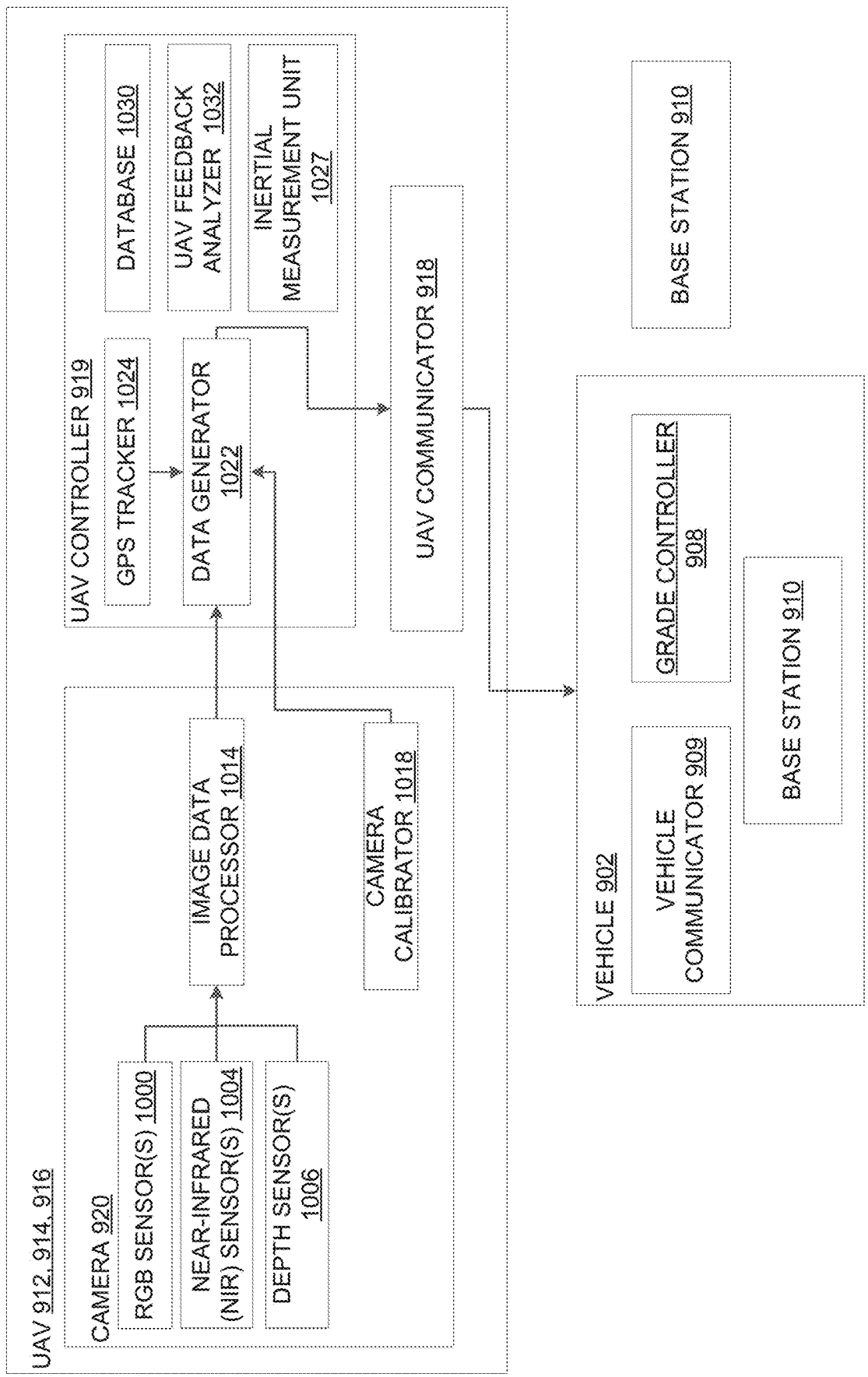
FIG. 10 is a block diagram of an example implementation of the example system of FIG. 9.

FIG. 10 is a block diagram of an example implementation of the system 900 of FIG. 9. As disclosed above in connection with FIG. 9, the example system 900 can include one or more UAVs 912, 914, 916. Each of the example UAV(s) 912, 914, 916 of FIG. 9 include a camera 920. In the example of FIG. 10, the example cameras 920 of each of the UAV(s) 912, 914, 916 includes at least one example red-green-blue (RGB) sensor 1000, at least one example near-infrared (NIR) sensor 1004, at least one example depth sensor 1006, an example image data processor 1014, and/or an example camera calibrator 1018. In some examples, the example red-green-blue (RGB) sensor(s) 1000, the example near-infrared (NIR) sensor(s) 1004, the example depth sensor(s) 1006, the example image data processor 1014, and/or the example camera calibrator 1018 function substantially the same as the corresponding ones of the example red-green-blue (RGB) sensor(s) 300, the example near-infrared (NIR) sensor(s) 304, the example depth sensor(s) 306, the example image data processor 314, and/or the example camera calibrator 318 of the example camera 120 described above in connection with FIG. 3. For example, the image data processor 1014 can align RGB image data, NIR image data, and/or depth data to create aligned image data including 3-D coordinates (e.g., based on the image data collected in the X-Y plane and the depth data collected in the Z plane). In some examples, where a desired output is an elevation map, the RGB sensor(s) 1000 and/or the NIR sensor(s) 1004 may be omitted to reduce costs and/or weight because the elevation map may be generated based on depth data from the depth sensor(s) 1006.

Further, as shown in the illustrated example of FIG. 10, the UAV controller 919 is provided with an example data generator 1022, an example GPS tracker 1024, an example inertial measurement unit (IMU) 1027, an example database 1030, and/or an example UAV feedback analyzer 1032. In some examples, the example GPS tracker 1024, the example inertial measurement unit 1027, the example database 1030, and the example UAV feedback analyzer 1032 function substantially the same as the corresponding ones of the example GPS tracker 324, the example IMU 327, the example database 330, and/or the example UAV feedback analyzer 332 of the example UAV controller 119 described above in connection with FIG. 3. For example, the IMU 1027 includes sensors to generate IMU data corresponding to the liner acceleration of the UAV(s), the angular velocity of the UAV(s), etc. In some examples, GPS data generated by the GPS tracker 1024 is fused with the IMU data to define the position, orientation, etc. of the UAV(s). In such examples, the resulting position data for the UAV(s) includes position and orientation of the UAV(s) (e.g., defines all six degrees of freedom).

The example data generator 1022 of FIG. 10 processes depth data collected from the depth sensor(s) 1006 to generate one or more elevation maps that model the elevation of the area 904 and/or portion(s) thereof. In some examples, the data generator 1022 processes depth data from the depth sensor(s) 1006 in conjunction with GPS data obtained from the GPS tracker 1024 and/or IMU data obtained from the IMU 1027. In some examples, the elevation map(s) are based on point cloud(s) generated from sensor data captured by the depth sensor(s) 1006, the RGB sensor(s) 1000 and/or the NIR sensor(s) 1004. The point cloud(s) can be generated based on the sensor data as substantially discussed above in connection with FIGS. 1-8. For example, pixels of the image data generated by the RGB sensor(s) 1000 and/or the NIR sensor(s) 1004 can be analyzed in conjunction with depth data from the depth sensor(s) 1006 to generate 3-D models of the elevation of the area 904 that visually depict, for instances, changes in elevation. The elevation map(s) can be stored in the database 1030 of the UAV controller 919.

As discussed above, in some examples, one or more of the first, second, and/or third UAVs 912, 914, 916 receives sensor data (e.g., image data, depth data) from one or more of the other UAVs. In such examples, the image data processor 1014 and/or the data generator 1022 of, for example, the first UAV 912 may perform one or more data processing operations on the sensor data received from the UAV 914 and/or the UAV 916 to determine elevation data corresponding to the portions of the area 904 captured by the second and/or third UAVs 914, 916 and generate an elevation map for the area 904. In other examples, the data generator 1022 of, for example, the first UAV 912 generates a landscape model based on elevation data and GPS data received from the second UAV 914 and/or the third UAV 916. In other examples, the data generator 1022 of, for example, the first UAV 912 receives landscape models (e.g., 3-D image data) from the second UAV 914 and/or the third UAV 912 and combines the landscape models to generate a landscape model for the area 904 and/or one or more portions thereof.

In the example shown in FIG. 10, the example data generator 1022 transmits the landscape model(s) or elevation map(s) to the UAV communicator 918. The UAV communicator 918 wirelessly transmits the landscape model(s) to the vehicle communicator 909 of the vehicle 902 (e.g., via WiFi, Bluetooth®, etc.). In other examples, the landscape model(s) are generated by the vehicle communicator 909. The vehicle communicator 909 transmits the landscape model(s) to the grade controller 908 of the vehicle 902 for display (e.g., via the GUI 911 of the vehicle 902) and/or analysis for controlling grading of land via the vehicle 902. In some examples, the UAV communicator 918 transmits the landscape model(s) of a given UAV when the UAV 912, 914, 916 is docked at the base station 910. As illustrated in FIG. 10, the base station 910 can be located at the vehicle 902 and/or a location separate from the vehicle 902. In some examples, the image data, the depth data, the GPS data, and/or the IMU data are used by the UAV controller 919 to determine a landing location of the UAV(s) 912, 914, 916 with respect to the base station 910, substantially as discussed above in connection with the UAV controller 119 of FIG. 3. The vehicle 902 may not be part of the system. Instead, the vehicle communicator 909, the grade controller 908, and the base station 910 may be part of the system and sold for integration into the vehicle (e.g., as an after-market add-on).

While an example manner of implementing the example system 900 of FIG. 9 is illustrated in FIG. 10, one or more of the elements, processes and/or devices illustrated in FIG. 10 may be combined, divided, re-arranged, omitted, eliminated and/or implemented in any other way. Further, the example grade controller 908, the example vehicle communicator 909, the example UAV(s) 912, 914, 916, the example, UAV communicator(s) 918, the example UAV controller(s) 919, the example camera(s) 920, the example RGB sensor(s) 1000, the example NIR sensor(s) 1004, the example depth sensor(s) 1006, the example image data processor 1014, the example camera calibrator 1018, the example data generator 1022, the example GPS tracker 1024, the example inertial measurement unit 1027, the example database 1030, the example UAV feedback analyzer 1032 and/or, more generally, the example system 900 of FIGS. 9 and 10 may be implemented by hardware, software, firmware and/or any combination of hardware, software and/or firmware. Thus, for example, any of the example grade controller 908, the example vehicle communicator 909, the example UAV(s) 912, 914, 916, the example, UAV communicator(s) 918, the example UAV controller(s) 919, the example camera(s) 920, the example RGB sensor(s) 1000, the example NIR sensor(s) 1004, the example depth sensor(s) 1006, the example image data processor 1014, the example camera calibrator 1018, the example data generator 1022, the example GPS tracker 1024, the example inertial measurement unit 1027, and/or the example UAV feedback analyzer 1032 and/or, more generally, the example system 900 of FIGS. 9 and 10 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example grade controller 908, the example vehicle communicator 909, the example UAV(s) 912, 914, 916, the example, UAV communicator(s) 918, the example UAV controller(s) 919, the example camera(s) 920, the example RGB sensor(s) 1000, the example NIR sensor(s) 1004, the example depth sensor(s) 1006, the example image data processor 1014, the example camera calibrator 1018, the example data generator 1022, the example GPS tracker 1024, the example inertial measurement unit 1027, and/or the example UAV feedback analyzer 1032 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 900 of FIGS. 9 and 10 may include one or more elements, processes and/or devices in addition to, or instead of, those illustrated in FIGS. 9 and 10, and/or may include more than one of any or all of the illustrated elements, processes and devices. Further, aspects of the example system 100 of FIGS. 1-3 may be combined with aspects of the example system 900 of FIGS. 9 and 10 in any suitable matter. For instance, the functionality of the example data generators 322, 1022 in each of FIGS. 3 and 9 may be combined.

Flowcharts representative of example machine readable instructions for implementing the example system 900 of FIGS. 9 and 10 are shown in FIGS. 11-14. In these examples, the machine readable instructions comprise a program for execution by a processor such as the UAV controller 919 shown in the example processor platform 1700 discussed below in connection with FIG. 17. The program may be embodied in software stored on a non-transitory computer readable storage medium such as a CD-ROM, a floppy disk, a hard drive, a digital versatile disk (DVD), a Blu-ray disk, or a memory associated with the UAV controller 919, but the entire program and/or parts thereof could alternatively be executed by a device other than the UAV controller 919 and/or embodied in firmware or dedicated hardware. Further, although the example program is described with reference to the flowcharts illustrated in FIGS. 11-14, many other methods of implementing the example system 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

Figure 11:
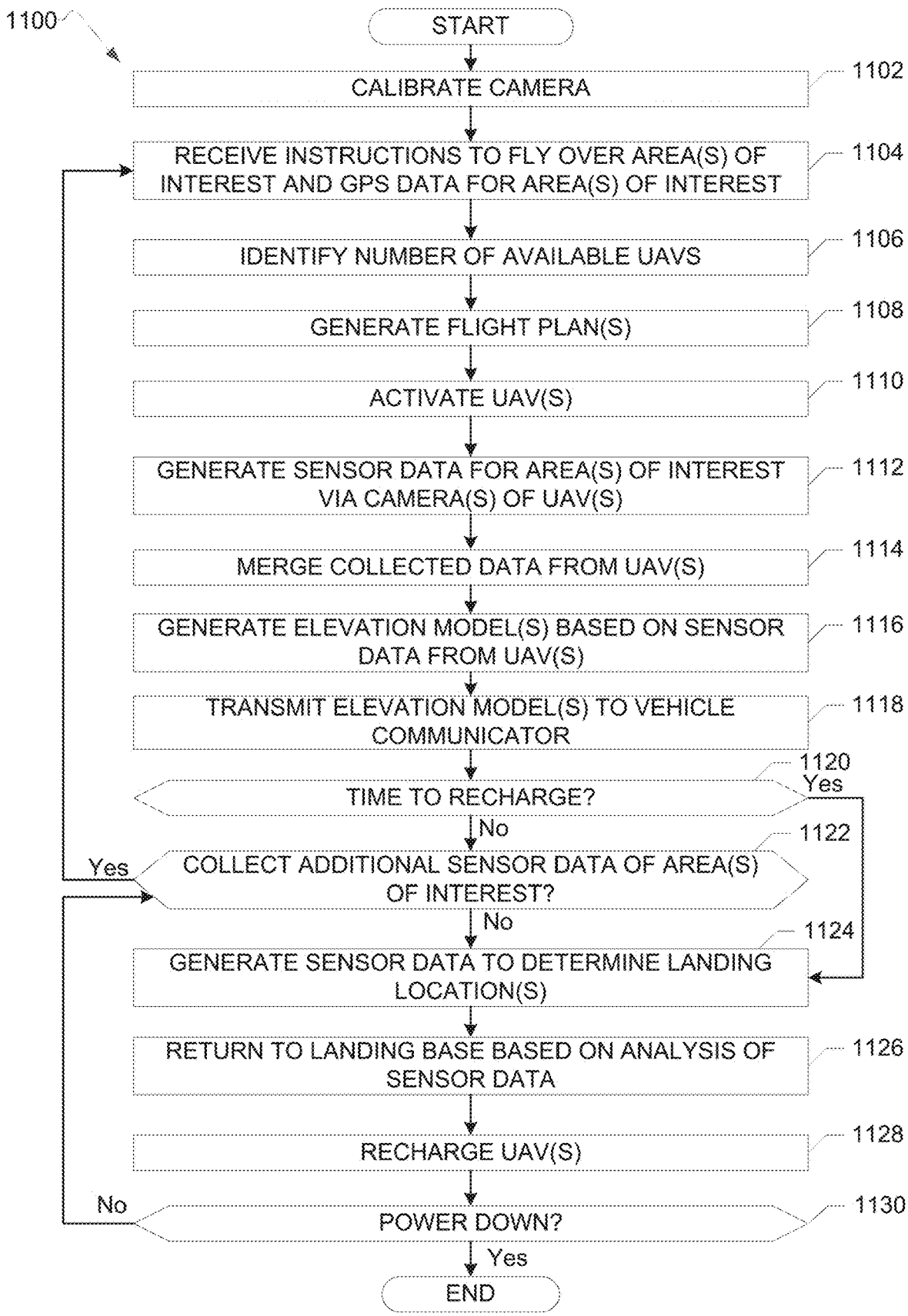
FIG. 11 is a flowchart representative of example machine readable instructions that may be executed to implement the example unmanned aerial vehicle of FIGS. 9 and 10.

As mentioned above, the example processes of FIGS. 11-14 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended FIG. 11 is a flowchart representative of example machine readable instructions 1100 that, when executed, cause the example UAV(s) 912, 914, 916 of FIGS. 9 and 10 to generate one or more elevation models or maps (which can include one or more point clouds) for use in construction or foresting applications. The example instructions of FIG. 11 can be executed by in whole or in part by one or more of the grade controller 908 (e.g., of the vehicle 902), the image data processor 1014 of the camera(s) 920 of any or all of the respective first, second, or third UAV(s) 912, 914, 916, and/or the UAV controller 919 of any of the respective first, second, or third UAVs 912, 914, 916 of FIGS. 9 and 10.

In the example of FIG. 11, the camera calibrator 1018 of the UAV 912, 914, 916 calibrates the camera 920 with respect to the RGB sensor(s) 1000, the NIR sensor(s) 1004, and/or the depth sensor(s) 1006 (block 1102). For example, the camera calibrator 1018 uses known image data to normalize the response of the RGB sensor(s) 1000 and the NIR sensor(s) 1004 to light.

In the example of FIG. 11, the grade controller 908 of the vehicle 902 receives instructions for the UAV(s) to fly over one or more areas of interest (block 1104). The instructions can include GPS coordinates for the area(s) of interest. In some examples, the instructions are received via one or more user inputs entered at the grade controller 908 via the GUI 911 of the vehicle 902. In other examples, the instruction(s) are sent to the UAV communicator 918 of the corresponding UAV(s) 912, 914, 916 by, for example, the vehicle communicator 909 of the vehicle 902. In such examples, the UAV communicator 918 relays the instruction(s) to the UAV controller 919 on board the respective UAVs 912, 914, and/or 916.

Based on the instructions, the grade controller 908 and/or the UAV controller 919 of the UAV(s) identify a number of available UAVs (block 1106). The UAVs 912, 914, 916 can be identified as available based on, for example, power level(s) (e.g., battery charge status) of the UAV(s), duration(s) of time that the UAV(s) have been docketed at the base station 910, duration(s) of preceding flight(s) of the UAV(s), maintenance statuses of the UAV(s), etc. In some examples, the grade controller 908 and/or the UAV controller 919 identify the available UAV(s) based on a determination that a particular UAV has sufficient power to fly to and over at least some of the area(s) of interest, capture image and/or depth data, and return to the base station 910.

In the example of FIG. 11, the grade controller 908 and/or the UAV controller 919 generate flight plan(s) for the available UAV(s) 912, 914, 916 (block 1108). For example, based on the GPS data for the area(s) to be surveyed and the power charge status of the available UAV(s), the grade controller 908 and/or the UAV controller 919 generate flight plan(s) including the GPS coordinates of the area(s) of interest and/or portion(s) thereof to be covered by corresponding one(s) of the UAVs. For example, the grade controller 908 and/or the UAV controller 919 can determine that the first UAV 912 will survey a first portion of the area 904 of FIG. 9 and the second UAV 914 will survey a second portion of the area 904.

In the example of FIG. 11, the UAV controller 919 of the corresponding UAV(s) 912, 914, 916 that have been identified as available UAV(s) activates the corresponding UAV (block 1110). In some examples, the UAV controller 919 activates the corresponding UAV 912, 914, 916 based on instructions received from the vehicle communicator 909 of the vehicle 902 and/or a UAV communicator 918 of another UAV. In some examples, activation of the UAV(s) 912, 914, 916 includes delivering the flight plan(s) to the corresponding UAV(s).

The activated UAV(s) 912, 914, 916 take off from, for example, the base station 910 and fly over the area(s) 904 according to the flight plan(s). The GPS tracker(s) 1024 of the activated UAV(s) track location(s) of the UAV(s) during flight relative to the GPS data for the area(s). In some examples, the IMU(s) 1027 of the activated UAV(s) generate IMU data corresponding to the linear acceleration of the UAV(s), the angular velocity of the UAV(s), and/or the magnetic field surrounding the UAV(s).

The UAV(s) 912, 914, 916 generate sensor data of the area(s) 904 via their respective camera(s) 920 during flight (block 1112). In the example of 10, the sensor data includes depth data generated via the depth sensor(s) 1006 of the camera(s) 920. The depth data includes measurements in the Z plane, such as a height of the camera(s) 920 of the UAV 912, 914, 916 relative to terrain in the area(s) 904. In some examples, the sensor data includes image data corresponding to the portions of the area(s) 904 for which depth data is collected. The image data can be generated by the RGB sensor(s) 1000 and/or the NIR sensor(s) 1004 of the camera(s) 920. The camera(s) 920 can be activated to generate depth data and/or image data by the image data processor 1014 of the camera(s) 920.

In some examples in which two or more UAVs are activated, the UAV controller 919 of one of the UAV(s) 912, 914, 916 merges (e.g., combines) the sensor data (e.g., the depth data, the image data) generated by the UAV(s) for the area(s) of interest (block 1114). The data can be transmitted between the UAV communicators 918 of two or more UAV(s) via the wireless communication link(s) 921. In some examples, the UAV controller 919 of, for example, the first UAV 912 receives raw image data and raw depth data from one or more other UAV(s) 914, 916. In such examples, the UAV controller 919 of the first UAV 912 processes the data from the UAV(s) by filtering the data, correlating the image and/or depth data based on GPS data, IMU data, etc. In some examples, the UAV controller 919 of, for example, the first UAV 912 receives pre-processed data (e.g., filtered data) from the other UAV(s) 914, 912. In such examples, the UAV controller 919 merges the pre-processed data with data collected and processed by the first UAV 912.

In other examples, the grade controller 908 of the vehicle 902 merges the data received from the UAV(s) 912, 914, 916 based on communication between the UAV communicator(s) 918 and the vehicle communicator 909 of the vehicle 902 (block 1114). The raw and/or processed data (e.g., depth data, image data, etc.) can be transmitted between the UAV communicator(s) 918 of the UAV(s) and the vehicle communicator 909 via the wireless communication link(s) 917.

The location of block 1114 merging the data generated by two or more UAVs in FIG. 11 can be different for different examples. In fact, the merging of data can occur at one or more different times in the example flow chart of FIG. 11, as discussed above.

In the example of FIG. 11, the UAV controller(s) 919 of the UAV(s) 912, 914, 916 generate the elevation model(s) (e.g., point cloud(s)) indicating elevations in the area of interest 904) based on the sensor data from the UAV(s) (block 1116). For example, the image data processor(s) 1014 of the camera(s) 920 process (e.g., filter) the depth data to determine elevation of land or other materials in the area. In some examples, the image data processor(s) 1014 process the image data to identify features of the land or other materials (e.g., gravel) with respect to the elevation (e.g., to verify changes in elevation reflected in the depth data). The UAV controller(s) 919 generate landscape model(s) or elevation map(s) (e.g., 3-D point clouds) that visually depict the elevation of the land in the area(s) 904 surveyed by the UAV(s) 912, 914, 916. In some examples, the UAV controller 919 of one of the UAV(s) 912, 914, 916 generates the landscape model(s) based on data received from the other UAV(s). In some examples, the grade controller 908 of the vehicle 902 generates the landscape model(s) based on the data received from the UAV(s).

In examples of FIG. 11 where the landscape model(s) are generated by the UAV(s), the UAV communicator(s) 918 transmit the corresponding elevation model(s) to the vehicle communicator 909 of the vehicle 902 (block 1118). In some examples, the vehicle 902 is in the area of interest at substantially the same time as the UAV(s) 912, 914, 916 or at a distance from the area of interest at which the vehicle 902 and the UAV(s) 912, 914, 916 can communicate via wireless communication link(s) 917. For example, the UAV communicator(s) 918 transmit the NDVI model(s) to the vehicle communicator 909 in substantially real-time. In some examples, the vehicle communicator 909 transmits the landscape model(s) to the grade controller 908 of the vehicle 902 for display and/or analysis with respect to setting or adjusting a grade of the vehicle 902 to remove land, gravel, and/or other material(s) from the area(s) 904. Thus, the grade controller 908 of the vehicle 902 receives data regarding the elevation of area(s) 904 in substantially real-time and can generate one or more instructions for grading and/or excavation of the area(s) based on current data.

The UAV controller(s) 919 of the corresponding UAV(s) 912, 914, 916 determine whether the UAV should be recharged (block 1120). The decision as to whether the UAV 912, 914, 916 should be recharged can be based on, for example, a power level of the UAV, whether the surveying is finished, a power state of the vehicle 902, etc.

If the UAV(s) 912, 914, 916 do not need to be recharged, the corresponding UAV controller(s) 919 determine that whether or not to collect additional sensor data (e.g., depth data, image data) of the area(s) 904 via the camera(s) 920 of the UAV(s) 912, 914, 916 (block 1122). If the UAV(s) 912, 914, 916 have not yet flown over all or substantially all of the area(s) 904 and collected sensor data of the defined area(s) 904 (e.g., based on the flight plan(s)), then control returns to block 1104 to receive additional instructions to cause the UAV(s) to fly over the same or new area(s) of interest.

If a determination is made that one or more of the UAV(s) 912, 914, 916 should be recharged, or if a determination is made that no additional image data is needed for the area(s) of interest, then the camera(s) 920 of the corresponding UAV(s) 912, 914, 916 generate sensor data to determine a landing location of the corresponding UAV(s) 912, 914, 916 with respect to the base station 910 (block 1124). For example, the UAV controller(s) 919 of the UAV(s) 912, 914, 916 can identify a location of the base station 910 from the image data, identify a height of the base station 910 from the depth data, etc. In some examples, the UAV controller(s) 919 of the UAV(s) 912, 914, 916 identify the location of the base station 910 based on one or more of the image data, the depth data, the GPS data generated by the GPS tracker 1024, and/or the IMU data generated by the IMU 1027.

In the example of FIG. 11, the UAV(s) 912, 914, 916 return to the base station 910 based on the analysis of the image data (block 1126). Thus, the 3-D images generated by the camera(s) 920 can be used by the UAV controller(s) 919 to increase precision in the respective landing location(s) of the UAV(s) 912, 914, 916.

In the example of FIG. 11, the UAV(s) 912, 914, 916 are recharged at the base station 910 (block 1128). Subsequently, the UAV controller 919 determines whether the UAV(s) 912, 914, 916 should be powered down (e.g., the vehicle is powered off which may indicate no additional sensor data collection is desired in the immediate future) (block 1130). If the UAV(s) 912, 914, 916 are not to be powered down, then control returns to block 1122 to receive instructions for additional flyovers. If the UAV(s) 912, 914, 916 are to be powered down, then the example of FIG. 11 ends.

Figure 12:
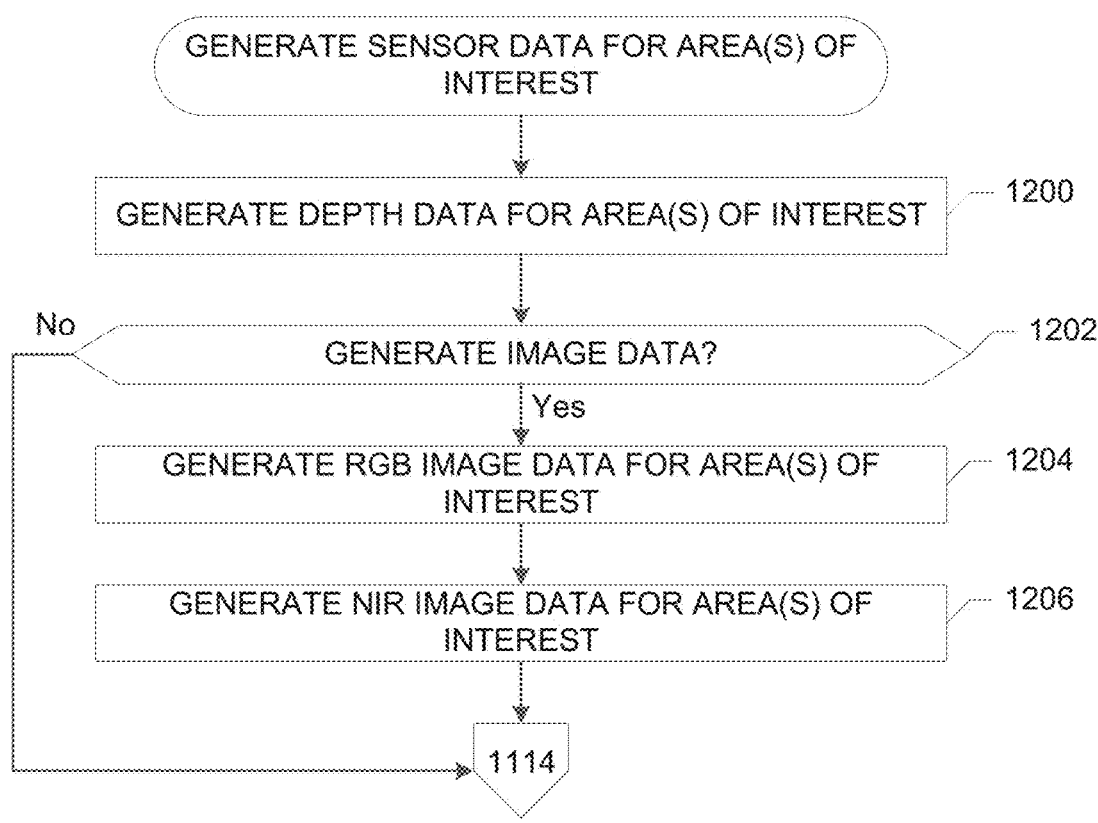
FIG. 12 is a flowchart representative of example machine readable instructions that may be executed to implement block 1112 of FIG. 11.

FIG. 12 is a flowchart representative of example machine readable instructions that may be executed to implement block 1112 of FIG. 111 to generate sensor data (e.g., image data, depth data) for one or more areas of interest (e.g., the area(s) 904 of FIG. 9) via one or more UAV(s) (e.g., the UAV(s) 912, 914, 916) flying over the area(s). The example instructions 1112 can be executed by the image data processor 1014 of the camera(s) 920 of any of the UAV(s) 912, 914, 916. In some examples, multiple instances of the instructions of FIG. 12 are executed in parallel by the same or different component(s) of the system.

In the example of FIG. 12, the depth sensor(s) 1006 generate depth data of the area(s) of interest (block 1204). The depth sensor(s) 1006 measure a distance of the camera 920 from, for example, the terrain of the area(s) 904 and/or materials in the area(s) 904 (e.g., piles of gravel) in the area(s) 904 to generate depth data for the area(s) 904.

In the example of FIG. 12, the image data processor 1014 of the camera(s) 920 determines whether image data should be generated (block 1202). As discussed above, in some examples, the elevation models are generated based on depth data collected by the camera(s) 920, or data collected in the Z plane as the UAV(s) 912, 914, 916 fly over the area(s) 904. In other examples, the elevation models are additionally based on image data (e.g., in the X-Y plane).

In the example of FIG. 12, if the camera(s) 920 are to collect image data, the RGB sensor(s) 1000 of the camera(s) 920 generate RGB image data of the area(s) of interest (block 1204). The RGB sensor(s) 1000 detect red, green, and/or blue wavelengths of light to generate RGB image data as the UAV(s) 912, 914, 916 fly over the area(s) 904. Also, in the example of FIG. 6, the NIR sensor(s) 1004 of the camera(s) 920 generate NIR image data of the area(s) of interest (block 1206). The NIR sensor(s) 1004 detect near-infrared wavelengths of light to generate NIR image data for the area(s) 104 as the UAV(s) 912, 914, 916 fly over the area(s). After execution of block 1206, control advances to block 1114 of FIG. 11.

Figure 13:
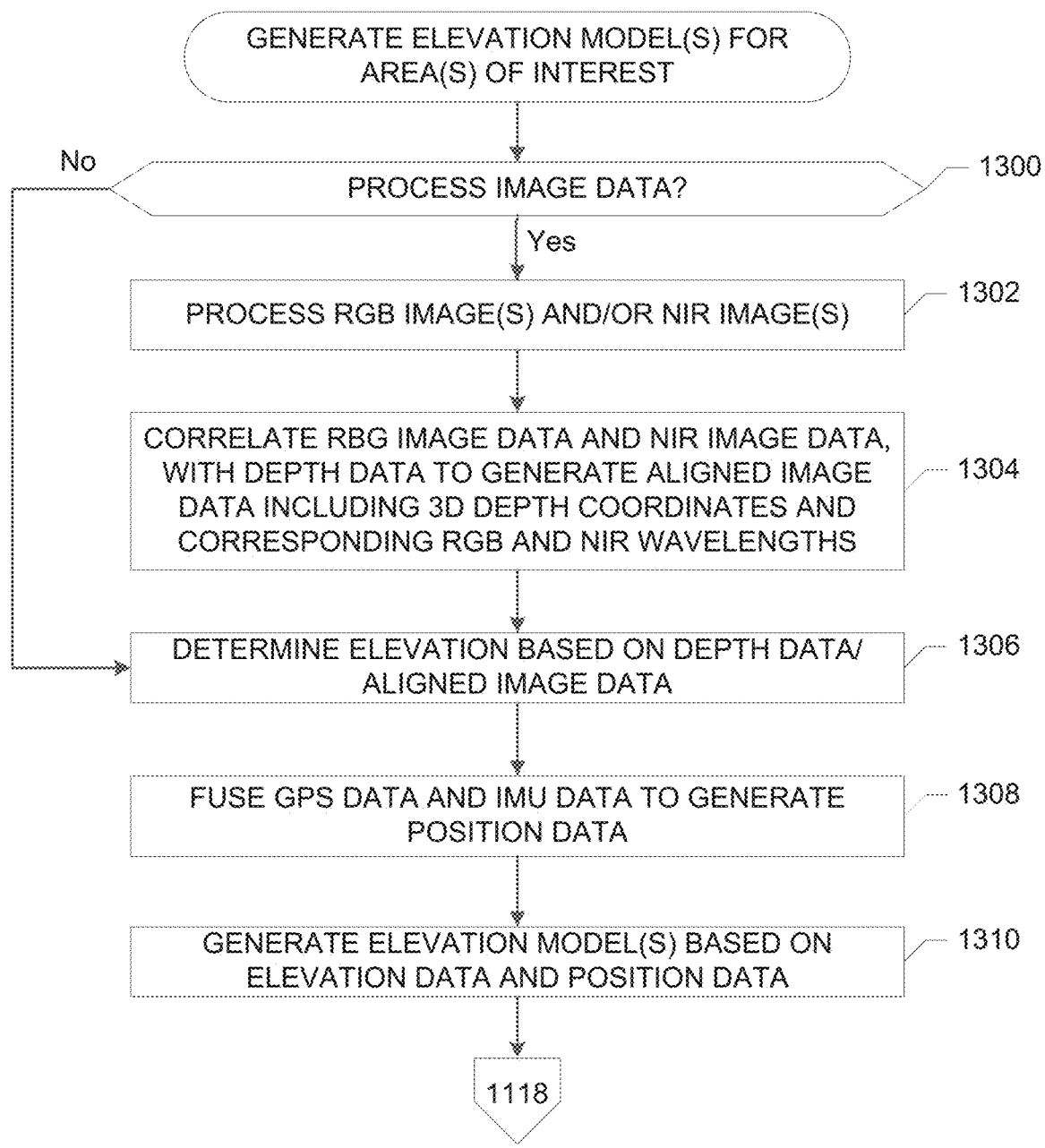
FIG. 13 is a flowchart representative of example machine readable instructions that may be executed to implement block 1116 of FIG. 11.

FIG. 13 is a flowchart representative of example machine readable instructions that may be executed to implement block 11116 of FIG. 11 to generate elevation model(s) (e.g., elevation map(s)) for terrain and/or other materials in one or more areas of interest (e.g., the area 904 of FIG. 9). The example instructions 1116 can be executed by one or more of the grade controller 908 (e.g., of the vehicle 902), the image data processor(s) 1014 of the camera(s) 920 of any or all of the respective first, second, or third UAVs 912, 914, 916, and/or the UAV controller 919 of any or all of the respective first, second, or third UAVs 912, 914, 916 of FIGS. 9 and 10. For ease of discussion, the following assumes the instructions as implemented by the image data processor(s) 1014 and the UAV controller(s) 919. In some examples, multiple instances of the instructions of FIG. 13 are executed in parallel by the same or different component(s) of the system.

In the example of FIG. 13, the image data processor(s) 1014 of the camera(s) 920 determine whether there is image data to process from the RGB sensor(s) 1000 and/or the NIR sensor(s) 1004 (block 1300). If there is image data to process, the image data processor(s) 1014 process the image data by performing one or more data processing techniques on the RGB image data and/or the NIR image data. For example, the image data processor(s) 1014 perform vignetting correction of the RGB image data and/or the NIR image to reduce a brightness and/or saturation of the image data.

In the example of FIG. 13, the image data processor(s) 1014 of the camera(s) 920 of the UAV(s) 912, 914, 916 correlate the RGB image data, the NIR image data, and the depth data generated by the depth sensor(s) 1006 (block 1304). Based on the correlation, the image data processor(s) 1014 generate aligned image data that includes 3-D coordinate data (e.g., based on the image data collected in the X-Y plane and the depth data collected in the Z plane) and corresponding spectral channels, namely, red, green, blue, and NIR wavelength values for the coordinates.

In the example of FIG. 13, the data generator(s) 1022 of the UAV controller(s) 919 of the UAV(s) 912, 914, 916 determine elevation for the area(s) of interest based on the depth data generated by the depth sensor(s) 1006 (block 1306). For example, the data generator(s) 1022 analyze measurements corresponding to the distance of the UAV(s) from the terrain in the area(s) of interest as the UAV(s) fly over the terrain. Based on the measurements, the data generator(s) 1022 determine the elevation of the area(s). In examples where the camera(s) 920 capture image data and the image data processor(s) 1014 generate the aligned image data, the data generator(s) 1022 can analyze the image data to, for example, correlate the elevation data calculated from the depth data to features captured in the image data (e.g., changes in terrain). In some examples, the data generator(s) 1022 verify the elevation data based on the image data.

In the example of FIG. 13, the data generator(s) 922 combine or fuse GPS data obtained from the GPS tracker 1024 with IMU data obtained from the IMU 1027 as the UAV(s) fly over the area(s) 904 to generate position data (block 1308). In the example of FIG. 13, the position data includes both the position and orientation of the UAV(s) 912, 914, 916 (e.g., defines all six degrees of freedom) during the time period over which the UAV(s) fly over the area(s) 904.

In the example of FIG. 13, the data generator(s) 1022 of the UAV controller(s) 919 of the UAV(s) 912, 914, 916 generate elevation model(s) of the land and/or other materials in the area(s) 904 based on the elevation data and the position data (block 1310). The data generator(s) 1022 correlate the elevation data and the position data to create one or more elevation models that visually depict the elevation of the area 904. The elevation model(s) can include 3-D or 2-D models (e.g., point cloud(s), 3-D image data or maps). After completion of block 1310, control advances to with block 1118 of FIG. 11.

As discussed above, any of the example instructions 1116 of FIG. 13 may be executed by the grade controller 908 of the vehicle 902. For example, the grade controller 908 can calculate the elevation for the area(s) of interest and generate the elevation model(s) based on processed depth data and/or image data received from the UAV(s).

Figure 14:
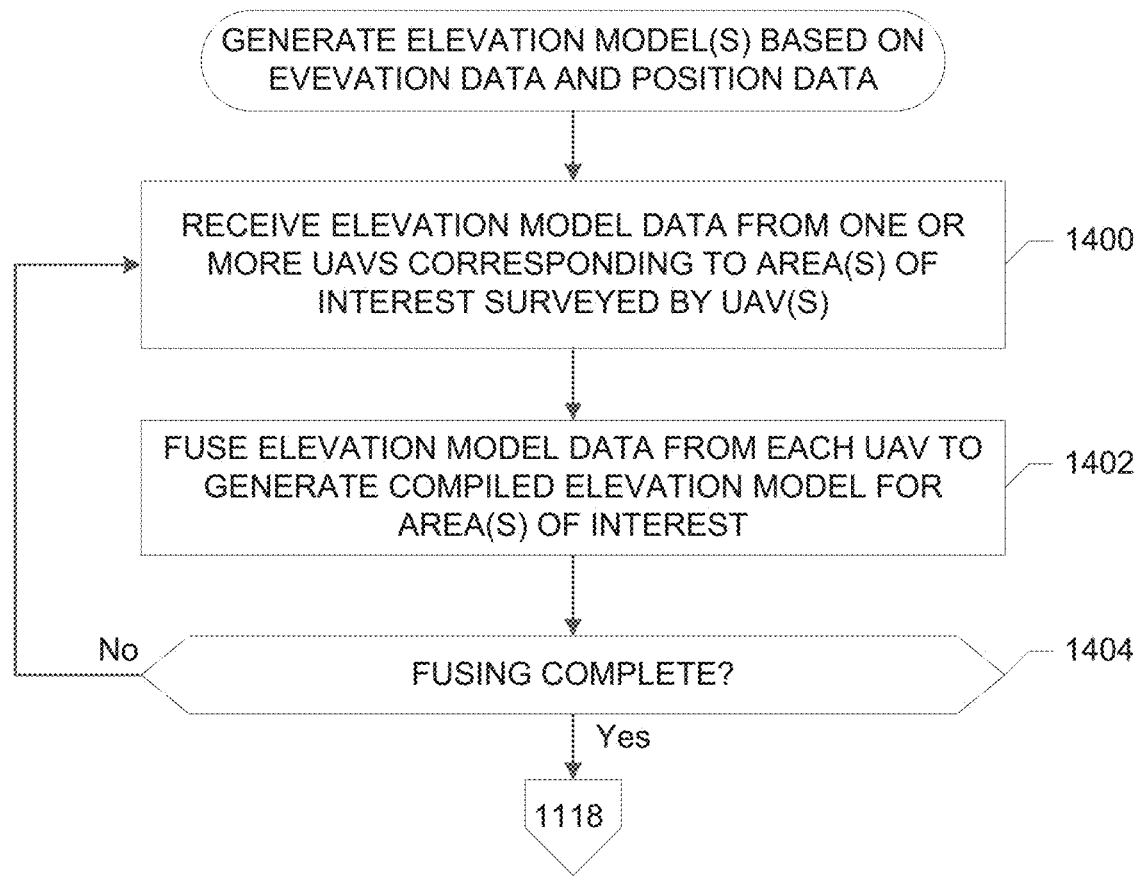
FIG. 14 is a flowchart representative of example machine readable instructions that may be executed to implement block 1310 of FIG. 13.

FIG. 14 is a flowchart representative of example machine readable instructions that may be executed to implement block 1310 of FIG. 7 to generate elevation model(s) based on elevation data and position data. The example instructions 1310 can be executed by the grade controller 908 (e.g., of the vehicle 902) and/or the UAV controller 919 of any or all of the respective first, second, or third UAVs 912, 914, 916 of FIGS. 9 and 10. For ease of discussion, the following assumes the instructions of FIG. 14 are executed in one or more of the UAV(s). In some examples, multiple instances of the instructions of FIG. 14 are executed in parallel by the same or different component(s) of the system.

In the example of FIG. 13, the UAV communicator 918 of one of the UAVs 912, 914, 916 receives elevation model data from one or more other UAVs 912, 914, 916 corresponding to the area(s) of interest surveyed by the UAV(s) (block 1400). The elevation model data can include elevation measurements calculated by the UAV(s) 912, 914, 916 and/or image data corresponding to the area(s) (e.g., in the X-Y-Z planes) that is used to create one or more point clouds, or visual representations of the elevation of the area(s) 904. In other examples, the elevation model data includes point cloud image data (e.g., 3-D image data) generated by the UAV(s) 912, 914, 916. For example, the second UAV 914 can be activated to survey a portion of the area 904 of FIG. 9 (e.g., based on the flight plan determined in FIG. 11). The elevation model data can include GPS data and/or IMU data indicative of a position and/or orientation of the UAV(s) when the corresponding depth data and, in some examples, image data was collected. The UAV communicator 918 of the first UAV 912 can receive elevation model data from the second UAV 914 corresponding to depth data (and, in some examples, image data) collected by the second UAV 914 for the portion 202 of the area 904 of FIG. 9. The data can be transmitted between the UAV(s) 912, 914, 916 via one or more wireless transmission protocols.

The data generator 922 of the UAV 912, 914, 916 fuses the received elevation model data from the UAV(s) 912, 914, 916 to generate an elevation model (e.g., a 3-D point cloud) for the area of interest (block 1402). For example, the data generator 922 combines the elevation model data corresponding to different portions of an area 904 to generate an elevation model for all or substantially all of the portions of the area 904 over which the UAV(s) 912, 914, 916 fly. For example, the data generator 922 of the UAV designated to perform the fusing (e.g., UAV 914) may take a median or average of the elevation data determined by the respective UAV(s) 912, 914, 916 to generate the elevation model. In other examples, the data generator 922 may average pixel values in point cloud image data (e.g., depth data and image data) generated by the UAV(s) 912, 914, 916 that correspond to shared coverage portion(s) of the area 904.

In the example of FIG. 14, the data generator 1022 determines whether fusing of the elevation model data is complete (block 1404). If fusing is not complete, control returns to block 1400 to continue receiving and fusing elevation model data. When fusing is complete, the example instructions of FIG. 14 end and control returns to block 1118.

Although the example instructions 1310 of FIG. 14 are discussed above as implemented by a UAV controller 919 of one of the UAV(s) 912, 914, 916, one or more of the instructions of FIG. 14 can alternatively be implemented by the example grade controller 908 of the vehicle 902 of FIG. 9 and/or in other one(s) of the UAV(s). For example, the UAV(s) 912, 914, 916 can transmit the NDVI model data (e.g., vegetation indices, GPS data, IMU data, 3-D point cloud image data) to the grade controller 908 (e.g., in substantially real-time as the data is generated) from the respective UAV(s). The grade controller 908 can fuse the data received from the UAV(s) to generate NDVI model(s) at the vehicle 902. Thus, in some examples, data generated by the UAV(s) is consolidated at the vehicle 902.

Figure 15:
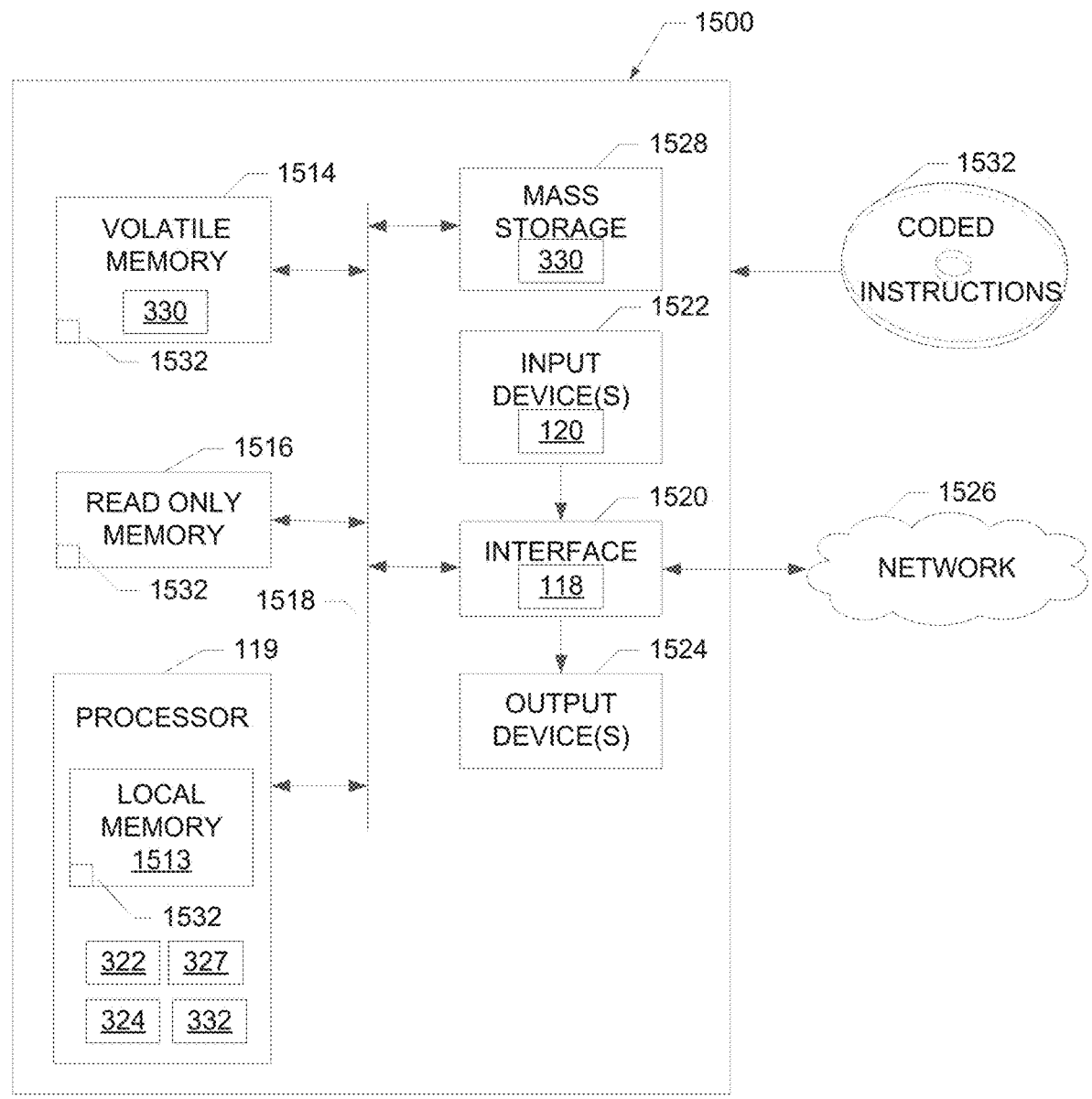
FIG. 15 illustrates an example processor platform that may execute the example instructions of FIG. 5, FIG. 6, FIG. 7 and/or FIG. 8 to implement the example system and/or the example unmanned aerial vehicle of FIGS. 1-3.

FIG. 15 is a block diagram of an example processor platform 1500 structured to execute the instructions of FIGS. 5, 6, 7, and/or 8 to implement the example UAV communicator 118, the example UAV controller 119, the example data generator 322, the example GPS tracker 324, the example IMU 327, the example UAV feedback analyzer 332, the example camera 120, the example RGB sensor(s) 300, the example NIR sensor(s) 304, the example depth sensor(s) 306, the example image data processor 314, the example camera calibrator 318, and/or, more generally, the example UAV(s) 112, 114, 116 of FIGS. 1-3. The processor platform 1500 can be, for example, a server, a printed circuit board with appropriate logic, a personal computer, an ASIC, or any other type of computing device.

The processor platform 1500 of the illustrated example includes a processor implementing the UAV controller 119. The processor 119 of the illustrated example is a semiconductor based hardware device such as a processor. For example, the processor 119 can be implemented by one or more integrated circuits, logic circuits, microprocessors or controllers from any desired family or manufacturer. The hardware processor may be a semiconductor based (e.g., silicon based) device. In this example, the processor 119 implements the example data generator 322, the example GPS tracker 324, the example IMU 327, and the example UAV feedback analyzer 332.

The processor 119 of the illustrated example includes a local memory 1513 (e.g., a cache). The processor 119 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller. The database 330 of the processor 119 may be implemented by the main memory 1514, 1516 and/or the local memory 1513.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 119. The input device(s) can be implemented by, for example, an audio sensor, a microphone, a camera (still or video) 120, a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a touchscreen, a tactile output device, and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.). In this example, the UAV communicator 118 is implemented by the interface circuit 1520.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives. Some or all of the database 330 may be stored in the mass storage 1528.

The coded instructions 1532 of FIGS. 5, 6, 7, and/or 8 may be stored in the mass storage device 1528, in the volatile memory 1514, in the non-volatile memory 1516, and/or on a removable tangible computer readable storage medium such as a CD or DVD.

Figure 16:
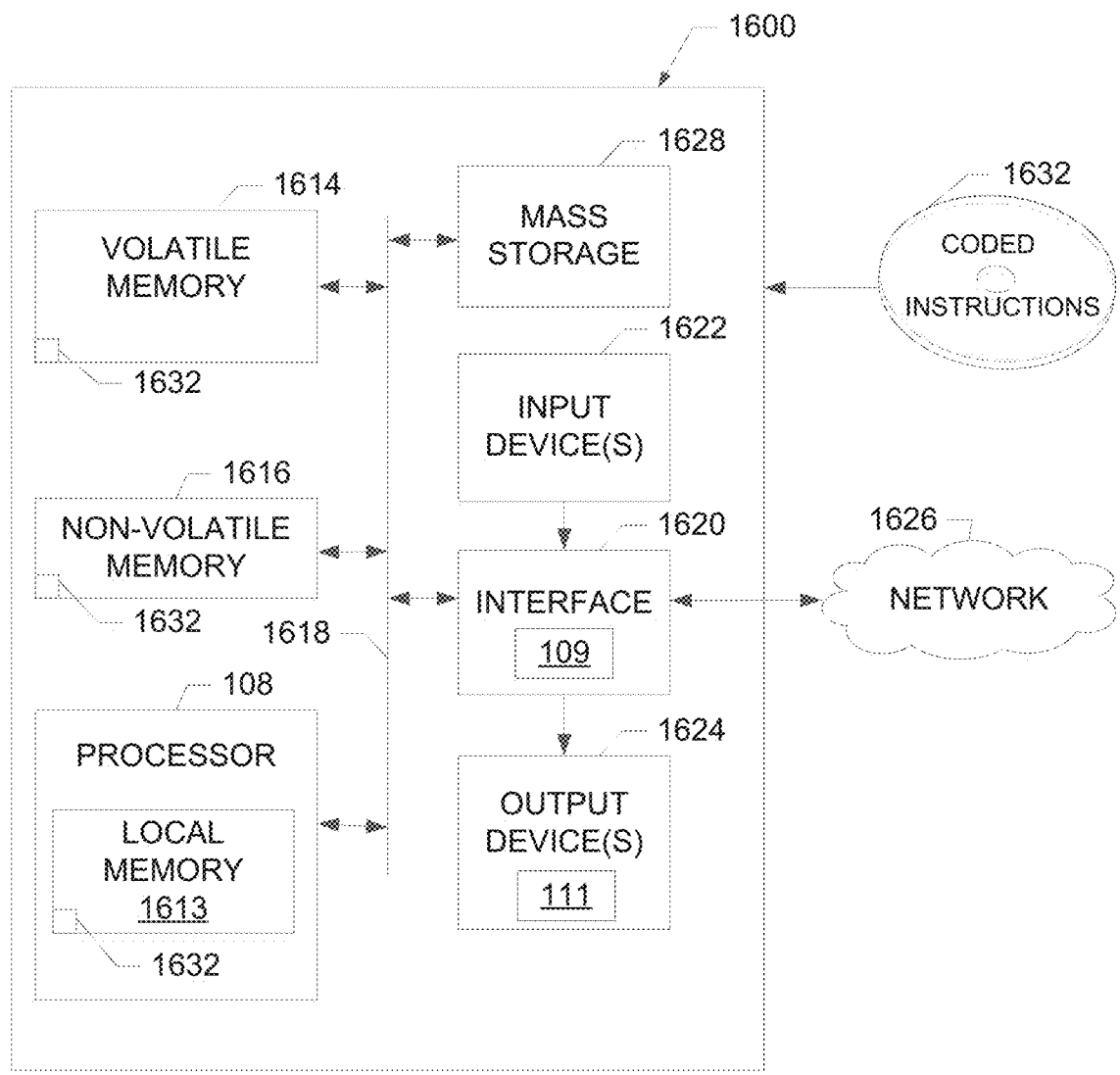
FIG. 16 is a block diagram of an example processor platform constructed to execute the example instructions of FIG. 5, FIG. 7, and/or FIG. 8 to implement the example system of FIGS. 1-3.

FIG. 16 is a block diagram of an example processor platform 1600 structured to execute the instructions of FIGS. 5, 7, and/or 8 to implement the example vehicle communicator 109, the example dispersant controller 108, and/or the example graphical user interface 111 at, for example, the example vehicle 102 of FIGS. 1-3. The processor platform 1600 can be, for example, a printed circuit board with appropriate logic, a server, a personal computer, an ASIC or any other type of computing device.

The processor platform 1600 of the illustrated example includes a processor implementing the dispersant controller 108. The processor 108 of the illustrated example is hardware. For example, the processor 108 can be implemented by one or more integrated circuits, logic circuits, microprocessors or controllers from any desired family or manufacturer. The hardware processor may be a semiconductor based (e.g., silicon based) device.

The processor 108 of the illustrated example includes a local memory 1613 (e.g., a cache). The processor 108 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1022 permit(s) a user to enter data and commands into the processor 108. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a touchscreen, a tactile output device, and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). In this example, the vehicle communicator 109 is implemented by the interface circuit 1620.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 5, 7, and/or 8 may be stored in the mass storage device 1628, in the volatile memory 1614, in the non-volatile memory 1616, and/or on a removable tangible computer readable storage medium such as a CD or DVD.

Figure 17:
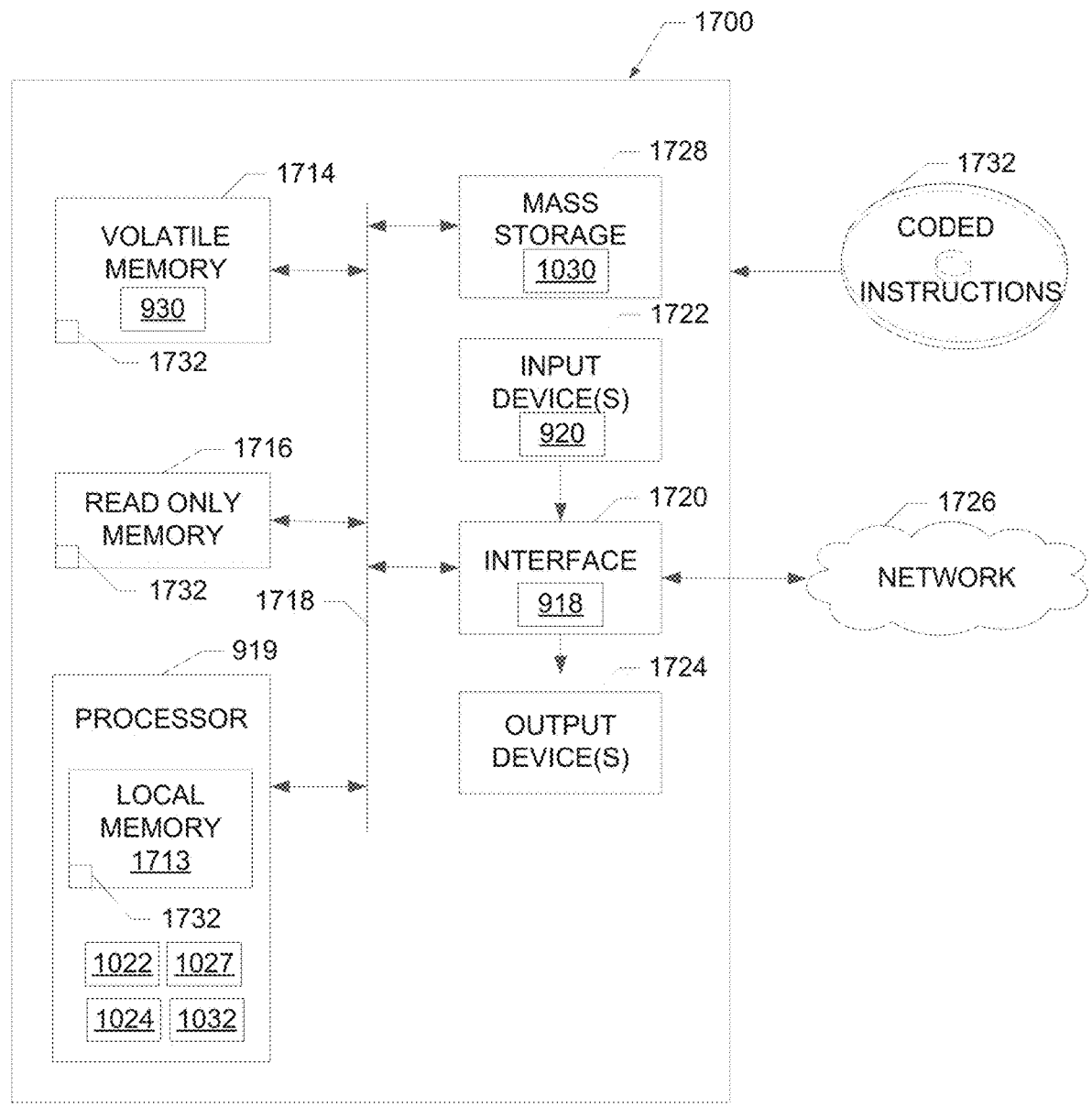
FIG. 17 illustrates an example processor platform that may execute the example instructions of FIG. 11, FIG. 12, FIG. 13, and/or FIG. 14 to implement the example system and/or the example unmanned aerial vehicle of FIGS. 9 and 10.

FIG. 17 is a block diagram of an example processor platform 1700 structured to execute the instructions of FIGS. 11, 12, 13, and/or 14 to implement the example UAV communicator 918, the example UAV controller 919, the example data generator 1022, the example GPS tracker 1024, the example IMU 1027, the example UAV feedback analyzer 1032, the example camera 920, the example RGB sensor(s) 1000, the example NIR sensor(s) 1004, the example depth sensor(s) 1006, the example image data processor 1014, the example camera calibrator 1018, and/or, more generally, the example UAV(s) 912, 914, 916 of FIGS. 9 and 10. The processor platform 1700 can be, for example, a printed circuit board with appropriate logic, a server, a personal computer, an ASIC, or any other type of computing device.

The processor platform 1700 of the illustrated example includes a processor implementing the UAV controller 919. The processor 919 of the illustrated example is a semiconductor based hardware device. For example, the processor 919 can be implemented by one or more integrated circuits, logic circuits, microprocessors or controllers from any desired family or manufacturer. The hardware processor may be a semiconductor based (e.g., silicon based) device. In this example, the processor 919 implements the example data generator 1022, the example GPS tracker 1024, the example IMU 1027, and the example UAV feedback analyzer 1032.

The processor 919 of the illustrated example includes a local memory 1713 (e.g., a cache). The processor 919 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller. The database 1030 of the processor 919 may be implemented by the main memory 1714, 1716 and/or the local memory 1713.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1222 permit(s) a user to enter data and commands into the processor 919. The input device(s) can be implemented by, for example, an audio sensor, a microphone, a camera (still or video) 920, a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a touchscreen, a tactile output device, and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.). In this example, the UAV communicator 918 is implemented by the interface circuit 1720.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives. Some or all of the database 930 may be stored in the mass storage 928.

The coded instructions 1732 of FIGS. 11, 12, 13, and/or 14 may be stored in the mass storage device 1728, in the volatile memory 1714, in the non-volatile memory 1716, and/or on a removable tangible computer readable storage medium such as a CD or DVD.

Figure 18:
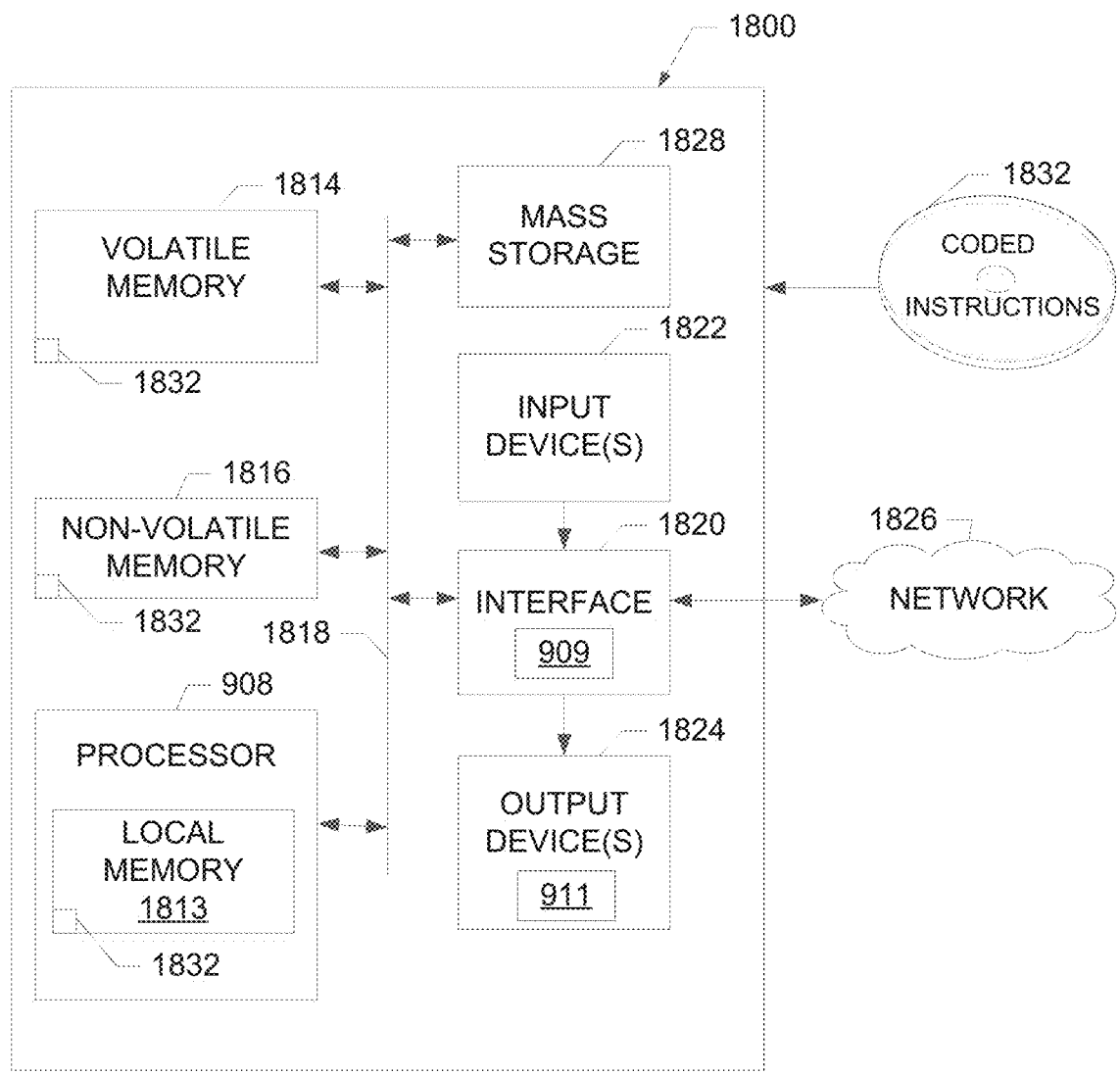
FIG. 18 is a block diagram of an example processor platform constructed to execute the example instructions of FIG. 11, FIG. 13, and/or FIG. 14 to implement the example system of FIGS. 9 and 10.

FIG. 18 is a block diagram of an example processor platform 1800 structured to execute the instructions of FIGS. 11, 12, and/or 14 to implement the example vehicle communicator 909, the example grade controller 908, and/or the example graphical user interface 911 at, for example, the example vehicle 902 of FIGS. 9 and 10. The processor platform 1800 can be, for example, a printed circuit board with appropriate logic, a server, a personal computer, an ASIC or any other type of computing device.

The processor platform 1800 of the illustrated example includes a processor implementing the grade controller 908. The processor 908 of the illustrated example is hardware. For example, the processor 908 can be implemented by one or more integrated circuits, logic circuits, microprocessors or controllers from any desired family or manufacturer. The hardware processor may be a semiconductor based (e.g., silicon based) device.

The processor 908 of the illustrated example includes a local memory 1813 (e.g., a cache). The processor 908 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and commands into the processor 908. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a touchscreen, a tactile output device, and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.). In this example, the vehicle communicator 909 is implemented by the interface circuit 1820.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives.

The coded instructions 1832 of FIGS. 11, 12, and/or 14 may be stored in the mass storage device 1828, in the volatile memory 1814, in the non-volatile memory 1816, and/or on a removable tangible computer readable storage medium such as a CD or DVD.

From the foregoing, it will be appreciated that methods, systems, and apparatus have been disclosed to generate landscape models based on image data collected via one or more unmanned aerial vehicles or UAVs flying over an area of interest. Disclosed examples use image data and depth data generated via camera(s) of respective unmanned aerial vehicle(s) and create an NDVI model of vegetation in a landscape (e.g., a 3-D model) and/or an elevation map to model landscape elevations that is wirelessly transmitted to a controller of a vehicle in the area of interest substantially in real-time. In some examples, the NDVI model and/or the elevation map may be generated onboard the vehicle based on the image and/or depth data transmitted to the vehicle. In the agricultural context, the landscape models (e.g., the NDVI models) generated using examples disclosed herein provide for more accurate representations of the growth state of the vegetation in the area and more precise determinations of locations at which agricultural treatment material(s) should be applied to vegetation as compared to, for example, historical data. Thus, disclosed examples provide for efficient distribution of agricultural treatment material(s) based on current information about the condition of the vegetation in an area of interest. In the context of construction and foresting, the landscape models (e.g., the elevation maps) generated using examples disclosed herein provide for more accurate representations of the elevation of an area in less time than elevation maps generated by survey engineers. Thus, disclosed examples provide for more efficient and precise excavation or grading of areas of interest than what was previously possible.

The following is a non-exclusive list of examples disclosed herein. Other examples may be included above. In addition, any of the examples disclosed herein can be considered in whole or in part, and/or modified in other ways.

Example 1 includes an unmanned aerial vehicle including a communicator to receive an instruction to request the unmanned aerial vehicle to fly over an area of interest; a camera to generate sensor data for the area of interest; and a data generator to generate a three-dimensional model of the area of interest based on the sensor data, the communicator to communicate the three-dimensional model to a vehicle.

Example 2 includes the unmanned aerial vehicle as defined in example 1, wherein the vehicle is a ground-based vehicle.

Example 3 includes the unmanned aerial vehicle as defined in example 1, wherein the sensor data includes depth data indicative of a height of the unmanned aerial vehicle relative to the area of interest.

Example 4 includes the unmanned aerial vehicle as defined in example 3, wherein the data generator is to determine an elevation of the area of interest based on the depth data.

Example 5 includes the unmanned aerial vehicle as defined in examples 1 or 3, wherein the sensor data includes image data for the area of interest.

Example 6 includes the unmanned aerial vehicle as defined in examples 1 or 2, wherein the three-dimensional model is an elevation map.

Example 7 includes the unmanned aerial vehicle as defined in examples 1 or 2, wherein the three-dimensional model is to be used to grade the area of interest.

Example 8 includes the unmanned aerial vehicle as defined in example 1, further including a global positioning system (GPS) tracker to generate GPS data for the unmanned aerial vehicle, the data generator to further generate the three-dimensional model based on the GPS data.

Example 9 includes the unmanned aerial vehicle as defined in example 8, further including an inertial measurement unit to generate inertial measurement unit data for the unmanned aerial vehicle, the data generator to further generate the three-dimensional model based on the inertial measurement unit data.

Example 10 includes the unmanned aerial vehicle as defined in example 9, wherein the data generator is to combine the GPS data and the inertial measurement unit data to generate position data for the unmanned aerial vehicle, the data generator to correlate the sensor data and the position data to generate the three-dimensional model.

Example 11 includes the unmanned aerial vehicle as defined in example 1, wherein the sensor data is first sensor data and the data generator is to receive second sensor data, the data generator to combine the first sensor data and the second sensor data to generate the three-dimensional model.

Example 12 includes the unmanned aerial vehicle as defined in example 11, wherein the first sensor data corresponds to a first portion of the area of interest and the second sensor data corresponds to a second portion of the area of interest.

Example 13 includes the unmanned aerial vehicle as defined in example 11, wherein the first sensor data and the second sensor data are for substantially a same portion of the area of interest.

Example 14 includes the unmanned aerial vehicle as defined in any of examples 11-13, wherein the sensor data is depth data indicative of an elevation of the area of interest.

Example 15 includes at least one non-transitory computer readable medium comprising instructions that, when executed, cause at least one unmanned aerial vehicle to at least: access sensor data generated for an area of interest while flying over the area of interest; generate a three-dimensional model of the area of interest based on the sensor data; and communicate the three-dimensional model to a ground-based vehicle substantially in real-time to service the area of interest.

Example 16 includes the at least one non-transitory computer readable medium as defined in example 15, wherein sensor data includes depth data and the instructions further cause the machine to determine an elevation of the area of interest based on the depth data.

Example 17 includes the at least one non-transitory computer readable medium as defined in example 15, wherein the three-dimensional model is an elevation map.

Example 18 includes the at least one non-transitory computer readable medium as defined in example 15, wherein the instructions further cause the at least one unmanned aerial vehicle to: access global position system (GPS) data; and generate the three-dimensional model based on the GPS data.

Example 19 includes the at least one non-transitory computer readable medium as defined in example 18, wherein the instructions further cause the at least one unmanned aerial vehicle to: generate inertial measurement unit data; and generate the three-dimensional model based on the inertial measurement unit data.

Example 20 includes the at least one non-transitory computer readable medium as defined in examples 19, wherein the instructions further cause the at least one unmanned aerial vehicle to: combine the GPS data and the inertial measurement unit data to generate position data; and correlate the sensor data and the position data to generate the three-dimensional model.

Example 21 includes the at least one non-transitory computer readable medium as defined in example 15, wherein the sensor data is first sensor data and the instructions further cause the at least one unmanned aerial vehicle to: access second sensor data; and combine the first sensor data and the second sensor data to generate the three-dimensional model.

Example 22 includes the at least one non-transitory computer readable medium as defined in example 21, wherein the first sensor data corresponds to a first portion of the area of interest and the second sensor data corresponds to a second portion of the area of interest.

Example 23 includes the at least one non-transitory computer readable medium as defined in example 22, wherein the first sensor data and the second sensor data are for substantially the same area of interest.

Example 24 includes the at least one non-transitory computer readable medium as defined in any of examples 21-23, wherein the sensor data is depth data indicative of an elevation of the area of interest.

Example 25 includes a system including: an unmanned aerial vehicle to collect sensor data for an area of interest while flying over an area of interest; means for generating a three-dimensional model of the area of interest based on the sensor data; and means for communicating the three-dimensional model to a vehicle.

Example 26 includes the system as defined in example 25, wherein the means for generating the three-dimensional model is to calculate an elevation of the area of interest based on the sensor data.

Example 27 includes the system as defined in example 25, wherein the unmanned aerial vehicle includes means for detecting height relative to terrain in the area of interest.

Example 28 includes the system as defined in examples 25 or 27, wherein the unmanned aerial vehicle includes means for generating image data of the area of interest.

Example 29 includes a method including: collecting image data with an unmanned aerial vehicle flying over an area of interest; generating, by executing an instruction with at least one processor, a three-dimensional model of the area of interest based on the sensor data; and communicating, by executing an instruction with the processor, the three-dimensional model to a vehicle to service the area of interest.

Example 30 includes the method as defined in example 29, wherein sensor data includes depth data indicative of a height of the unmanned aerial vehicle relative to the area of interest.

Example 31 includes the method as defined in example 29, further including determining an elevation of the area of interest based on the depth data.

Example 32 includes the method as defined in example 29, wherein the three-dimensional model is an elevation map Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle comprising:
   a communicator to receive an instruction to request the unmanned aerial vehicle to fly over an area of interest, the communicator to receive first sensor data for the area of interest from a second unmanned aerial vehicle;
   a camera to generate second sensor data for the area of interest; and
   a data generator to:
      merge the first sensor data and the second sensor data to generate combined sensor data; and
      generate a three-dimensional model of the area of interest based on the combined sensor data, the communicator to communicate the three-dimensional model to a vehicle different from the unmanned aerial vehicle.

2. The unmanned aerial vehicle as defined in claim 1, wherein the vehicle is a ground-based vehicle.

3. The unmanned aerial vehicle as defined in claim 1, wherein the second sensor data includes depth data indicative of a height of the unmanned aerial vehicle relative to the area of interest.

4. The unmanned aerial vehicle as defined in claim 3, wherein the data generator is to determine an elevation of the area of interest based on the depth data.

5. The unmanned aerial vehicle as defined in claim 1, wherein the first sensor data includes image data for the area of interest.

6. The unmanned aerial vehicle as defined in claim 1, wherein the three-dimensional model is an elevation map.

7. The unmanned aerial vehicle as defined in claim 1, wherein the three-dimensional model is to be used to grade the area of interest.

8. The unmanned aerial vehicle as defined in claim 1, wherein the first sensor data corresponds to a first portion of the area of interest and the second sensor data corresponds to a second portion of the area of interest.

9. The unmanned aerial vehicle as defined in claim 1, wherein the first sensor data and the second sensor data are for substantially a same portion of the area of interest.

10. The unmanned aerial vehicle as defined in claim 1, wherein one or more of the first sensor data or the second sensor data includes depth data indicative of an elevation of the area of interest.

11. At least one non-transitory computer readable medium comprising instructions that, when executed, cause a first unmanned aerial vehicle to at least:
   merge first sensor data generated for an area of interest while the first unmanned aerial vehicle is flying over the area of interest and second sensor data for the area of interest to generate combined sensor data, the second sensor data transmitted to the first unmanned aerial vehicle from a second unmanned aerial vehicle;
   generate a three-dimensional model of the area of interest based on the combined sensor data; and
   communicate the three-dimensional model to a ground-based vehicle substantially in real-time to service the area of interest.

12. The at least one non-transitory computer readable medium as defined in claim 11, wherein one or more of the first sensor data or the second sensor data includes depth data and the instructions further cause the first unmanned aerial vehicle to determine an elevation of the area of interest based on the depth data.

13. The at least one non-transitory computer readable medium as defined in claim 12, wherein the instructions further cause the first unmanned aerial vehicle to:
   access global position system (GPS) data; and
   generate the three-dimensional model based on the GPS data.

14. The at least one non-transitory computer readable medium as defined in claim 13, wherein the instructions further cause the first unmanned aerial vehicle to:
   generate inertial measurement unit data; and
   generate the three-dimensional model based on the inertial measurement unit data.

15. The at least one non-transitory computer readable medium as defined in claim 14, wherein the instructions further cause the first unmanned aerial vehicle to:
   combine the GPS data and the inertial measurement unit data to generate position data; and
   correlate the combined sensor data and the position data to generate the three-dimensional model.

16. The at least one non-transitory computer readable medium as defined in claim 11, wherein the first sensor data corresponds to a first portion of the area of interest, the second sensor data corresponds to the first portion, and the instructions cause the first unmanned aerial vehicle to:
   determine one of:
      a median of the first sensor data and the second sensor data, or
      an average of the first sensor data and the second sensor data; and
   generate the three-dimensional model based on the one of the median or the average.

17. A system comprising:
   a first unmanned aerial vehicle to collect first sensor data for an area of interest while flying over the area of interest;
   a second unmanned aerial vehicle to collect second sensor data for the area of interest while flying over the area of interest;
   means for generating a three-dimensional model of the area of interest, the means for generating to:
      merge the first sensor data and the second sensor data to generate combined sensor data; and
      generate the three-dimensional model based on the combined sensor data; and
   means for communicating the three-dimensional model to a vehicle.

18. The system as defined in claim 17, wherein the means for generating the three-dimensional model is to calculate an elevation of the area of interest based on one or more of the first sensor data or the second sensor data.

19. The system as defined in claim 17, wherein the first unmanned aerial vehicle includes means for detecting height relative to terrain in the area of interest.

20. The system as defined in claim 17, wherein the first unmanned aerial vehicle includes means for generating image data of the area of interest.

\* \* \* \* \*